(12) United States Patent
Datta et al.

(10) Patent No.: US 7,651,563 B2
(45) Date of Patent: Jan. 26, 2010

(54) SYNTHETIC MICROSPHERES AND METHODS OF MAKING SAME

(75) Inventors: Amlan Datta, Rancho Cucamonga, CA (US); Hamid Hojaji, Claremont, CA (US); David L. Melmeth, Upland, CA (US); James A. McFarlane, Rancho Cucamonga, CA (US); Thinh Pham, Kensington (AU); Noel E. Thompson, Carlingford (AU); Huagang Zhang, Yucaipa, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 10/648,009

(22) Filed: Aug. 25, 2003

(65) Prior Publication Data

US 2004/0079260 A1    Apr. 29, 2004

Related U.S. Application Data

(60) Provisional application No. 60/405,790, filed on Aug. 23, 2002, provisional application No. 60/471,400, filed on May 16, 2003.

(51) Int. Cl.
  *C04B 14/22* (2006.01)
  *C04B 14/24* (2006.01)

(52) U.S. Cl. .................. 106/672; 106/676; 106/679; 106/705; 106/716; 106/DIG. 1

(58) Field of Classification Search ............ 106/705, 106/DIG. 1, 672, 676, 679, 716; 501/33
  See application file for complete search history.

(56) References Cited

U.S. PATENT DOCUMENTS

| | | | |
|---|---|---|---|
| 1,819,093 A | 8/1931 | Hardinge |
| 2,619,776 A | 12/1952 | Potters |
| 2,676,892 A | 4/1954 | McLaughlin |
| 2,746,735 A | 5/1956 | Bradford |
| 2,762,619 A | 9/1956 | Booth |
| 2,782,018 A | 2/1957 | Bradford |
| 2,797,201 A | 6/1957 | Veatch |
| 2,838,881 A | 6/1958 | Plumat |

(Continued)

FOREIGN PATENT DOCUMENTS

CA    1040859    10/1978

(Continued)

OTHER PUBLICATIONS

"Novel raw material for producing heat insulating materials" Pawlowski et al., Silikattechnik (1982), 33(11), 339-340.*

(Continued)

*Primary Examiner*—Paul Marcantoni
(74) *Attorney, Agent, or Firm*—Gardere Wynne Sewell, LLP

(57) ABSTRACT

A building product incorporating synthetic microspheres having a low alkali metal oxide content is provided. The synthetic microspheres are substantially chemically inert and thus a suitable replacement for cenospheres derived from coal combustion, particularly in caustic environments such as cementitious mixtures. The building product can have a cementitious matrix such as a fiber cement product. The synthetic microspheres can be incorporated as a low density additive and/or a filler for the building product and/or the like.

7 Claims, 10 Drawing Sheets

U.S. PATENT DOCUMENTS

| | | | |
|---|---|---|---|
| 2,945,326 A | 7/1960 | Wood | |
| 2,947,115 A | 8/1960 | Wood | |
| 2,978,340 A | 4/1961 | Veatch et al. | |
| 3,010,177 A | 11/1961 | Thompson et al. | |
| 3,081,179 A | 3/1963 | Charvat et al. | |
| 3,215,505 A | 11/1965 | Schmalfeld et al. | |
| 3,256,105 A * | 6/1966 | Alford | |
| 3,279,905 A | 10/1966 | Wood et al. | |
| 3,293,014 A | 12/1966 | Callender et al. | |
| 3,297,411 A | 1/1967 | W. N. Dear | |
| 3,321,414 A | 5/1967 | Vieli | |
| 3,341,314 A | 9/1967 | Vukasovich et al. | |
| 3,348,956 A | 10/1967 | Ekdahl | |
| 3,365,315 A * | 1/1968 | Beck et al. | 501/33 |
| 3,495,961 A | 2/1970 | Lange | |
| 3,560,185 A | 2/1971 | Nylander | |
| 3,560,186 A | 2/1971 | Nylander | |
| 3,736,162 A | 5/1973 | Chvalovsky et al. | |
| 3,752,685 A * | 8/1973 | Honda et al. | |
| 3,782,985 A * | 1/1974 | Gebhardt | |
| 3,838,998 A * | 10/1974 | Matthews et al. | 65/21 |
| 3,873,475 A * | 3/1975 | Pechacek et al. | |
| 3,877,918 A | 4/1975 | Cerbo | |
| 3,887,386 A | 6/1975 | Majumdar et al. | |
| 3,888,957 A | 6/1975 | Netting et al. | |
| 3,904,377 A * | 9/1975 | Honda et al. | |
| 3,904,424 A | 9/1975 | Aoki et al. | |
| 3,909,283 A | 9/1975 | Warnke | |
| 3,924,901 A | 12/1975 | Phillips | |
| 3,954,390 A | 5/1976 | Akhundov et al. | |
| 4,002,482 A | 1/1977 | Coenen | |
| 4,046,548 A | 9/1977 | Wood et al. | |
| 4,057,908 A | 11/1977 | Mirliss et al. | |
| 4,059,423 A | 11/1977 | De Vos | |
| 4,102,773 A | 7/1978 | Green et al. | |
| 4,111,713 A * | 9/1978 | Beck | |
| 4,133,854 A | 1/1979 | Hendricks | |
| 4,153,439 A | 5/1979 | Tomic et al. | |
| 4,161,389 A | 7/1979 | Staffin et al. | |
| 4,205,992 A | 6/1980 | Mogensen et al. | |
| 4,217,335 A | 8/1980 | Sasaki et al. | |
| 4,226,841 A | 10/1980 | Komeya et al. | |
| 4,234,344 A * | 11/1980 | Tinsley et al. | |
| 4,235,753 A | 11/1980 | Brown et al. | |
| 4,235,836 A * | 11/1980 | Wassell et al. | 264/333 |
| 4,243,421 A | 1/1981 | Kume | |
| 4,252,193 A * | 2/1981 | Powers et al. | 166/292 |
| 4,292,206 A | 9/1981 | Barnes, Jr. et al. | |
| 4,303,732 A * | 12/1981 | Torobin | 428/33 |
| 4,304,604 A | 12/1981 | Daerr et al. | |
| 4,305,758 A * | 12/1981 | Powers et al. | 106/676 |
| 4,307,142 A | 12/1981 | Blitstein et al. | |
| 4,330,634 A | 5/1982 | Rodaway | |
| 4,332,618 A * | 6/1982 | Ballard | 501/17 |
| 4,336,338 A | 6/1982 | Downs et al. | |
| 4,340,407 A | 7/1982 | Anderson et al. | |
| 4,362,566 A * | 12/1982 | Hinterwaldner | 521/180 |
| 4,363,878 A | 12/1982 | Yamamoto et al. | |
| 4,370,166 A * | 1/1983 | Powers et al. | 106/676 |
| 4,394,346 A | 7/1983 | Morooka | |
| 4,411,847 A * | 10/1983 | Netting et al. | 264/7 |
| 4,430,108 A | 2/1984 | Hojaji | |
| 4,448,599 A | 5/1984 | Mackenzie et al. | |
| 4,475,936 A | 10/1984 | Aston et al. | |
| 4,501,830 A * | 2/1985 | Miller et al. | 523/401 |
| 4,504,320 A * | 3/1985 | Rizer et al. | 106/708 |
| 4,512,736 A | 4/1985 | Wader et al. | |
| 4,519,777 A | 5/1985 | Akhtyamov et al. | |
| 4,538,530 A | 9/1985 | Whitman | |
| 4,540,629 A | 9/1985 | Sands et al. | |
| 4,595,662 A | 6/1986 | Mochida et al. | |
| 4,602,962 A * | 7/1986 | Fehlmann | |
| 4,621,024 A | 11/1986 | Wright | |
| 4,623,390 A * | 11/1986 | Delmonico | 106/15.05 |
| 4,624,798 A | 11/1986 | Gindrup et al. | |
| 4,629,413 A | 12/1986 | Michelson et al. | |
| 4,637,990 A | 1/1987 | Torebin et al. | |
| 4,643,753 A | 2/1987 | Braun | |
| 4,652,433 A | 3/1987 | Ashworth et al. | |
| 4,652,535 A | 3/1987 | Mackenzie et al. | |
| 4,657,810 A * | 4/1987 | Douden | 428/313.9 |
| 4,661,137 A * | 4/1987 | Garnier et al. | 65/22 |
| 4,677,022 A | 6/1987 | Dejaiffe | |
| 4,687,752 A * | 8/1987 | Peters | 501/121 |
| 4,749,398 A | 6/1988 | Braun | |
| 4,751,202 A | 6/1988 | Toussaint et al. | |
| 4,751,203 A | 6/1988 | Toussaint et al. | |
| 4,752,061 A | 6/1988 | Dalton et al. | |
| 4,767,726 A | 8/1988 | Marshall | |
| 4,769,189 A | 9/1988 | Douden | |
| 4,818,289 A | 4/1989 | Mantymaki et al. | |
| 4,818,290 A | 4/1989 | Tuovinen et al. | |
| 4,819,289 A | 4/1989 | Gibbs | |
| 4,826,788 A | 5/1989 | Dennert et al. | |
| 4,830,989 A | 5/1989 | Trivedi et al. | |
| 4,837,069 A * | 6/1989 | Bescup et al. | 428/148 |
| 4,867,931 A | 9/1989 | Cochran, Jr. | |
| 4,871,495 A | 10/1989 | Helferich et al. | |
| 4,882,302 A | 11/1989 | Horiuchi et al. | |
| 4,888,057 A | 12/1989 | Nguyen et al. | |
| 4,894,081 A | 1/1990 | Neusy et al. | |
| 4,904,292 A | 2/1990 | Neusy et al. | |
| 4,928,479 A | 5/1990 | Shekleton et al. | |
| 4,937,210 A | 6/1990 | Jones et al. | |
| 4,946,811 A | 8/1990 | Tuovinen et al. | |
| 4,981,666 A | 1/1991 | Yamada et al. | |
| 4,983,550 A * | 1/1991 | Goetz et al. | 501/33 |
| 5,002,696 A | 3/1991 | White | |
| 5,022,897 A | 6/1991 | Balcar et al. | |
| 5,064,784 A | 11/1991 | Saito et al. | |
| 5,069,702 A * | 12/1991 | Block et al. | 65/22 |
| 5,077,241 A | 12/1991 | Moh et al. | |
| 5,128,114 A | 7/1992 | Schwartz | |
| 5,143,534 A | 9/1992 | Kilner et al. | |
| 5,154,596 A | 10/1992 | Schwartz et al. | |
| 5,164,003 A * | 11/1992 | Bosco et al. | 106/287.1 |
| 5,176,732 A * | 1/1993 | Block et al. | 65/22 |
| 5,190,737 A | 3/1993 | Weimer et al. | |
| 5,194,334 A | 3/1993 | Uerdingen et al. | |
| 5,217,928 A | 6/1993 | Goetz et al. | |
| 5,253,991 A | 10/1993 | Yokota et al. | |
| 5,256,180 A | 10/1993 | Garnier et al. | |
| 5,292,690 A | 3/1994 | Kawachi et al. | |
| 5,349,118 A | 9/1994 | Davidovits | |
| 5,384,345 A * | 1/1995 | Naton | 523/218 |
| 5,407,983 A * | 4/1995 | Naton | 524/113 |
| 5,443,603 A | 8/1995 | Kirkendall | |
| 5,458,973 A | 10/1995 | Jeffs | |
| 5,534,348 A * | 7/1996 | Miller et al. | 428/402 |
| 5,558,822 A | 9/1996 | Gitman et al. | |
| 5,559,170 A | 9/1996 | Castle | |
| 5,580,907 A | 12/1996 | Savin | |
| 5,591,684 A * | 1/1997 | Kawachi et al. | 501/33 |
| 5,601,789 A | 2/1997 | Ruhl et al. | |
| 5,609,833 A | 3/1997 | R uhl et al. | |
| 5,611,833 A | 3/1997 | Brahmbhatt et al. | |
| 5,611,883 A | 3/1997 | Tompkins et al. | |
| 5,618,173 A | 4/1997 | Ruhl et al. | |
| 5,655,853 A | 8/1997 | Wormser | |
| 5,658,656 A | 8/1997 | Whitney et al. | |
| 5,676,536 A | 10/1997 | Ruhl et al. | |
| 5,676,563 A | 10/1997 | Kondo et al. | |
| 5,743,393 A | 4/1998 | Webb et al. | |
| 5,849,055 A | 12/1998 | Aria et al. | |

| | | | | | | | |
|---|---|---|---|---|---|---|---|
| 5,858,083 | A | 1/1999 | Stav et al. | EP | 0 801 037 | B1 | 8/2000 |
| 5,883,029 | A | 3/1999 | Castle | EP | 1 156 021 | A1 | 11/2001 |
| 5,895,768 | A | 4/1999 | Speit | EP | 1 160 212 | A1 | 12/2001 |
| 5,899,256 | A * | 5/1999 | Rohatgi ................. 164/97 | EP | 1172341 | | 1/2002 |
| 5,925,449 | A | 7/1999 | Davidovits | EP | 0931778 | | 4/2002 |
| 5,932,347 | A | 8/1999 | Rapp et al. | EP | 0999232 | | 3/2004 |
| 5,935,699 | A | 8/1999 | Barber | EP | 0891954 | | 4/2004 |
| 5,967,211 | A | 10/1999 | Lucas et al. | EP | 1891984 | A1 | 2/2008 |
| 6,027,330 | A | 2/2000 | Lifshits | FR | 2671072 | | 7/1992 |
| 6,034,155 | A | 3/2000 | Espeland et al. | GB | 413294 | | 7/1934 |
| 6,048,593 | A | 4/2000 | Espeland et al. | GB | 682432 | | 11/1952 |
| 6,077,327 | A | 6/2000 | Hamayoshi et al. | GB | 0740145 | | 11/1955 |
| 6,105,888 | A | 8/2000 | Goehner et al. | GB | 743866 | | 1/1956 |
| 6,171,651 | B1 | 1/2001 | Brown | GB | 744070 | | 2/1956 |
| 6,207,077 | B1 | 3/2001 | Burnell-Jones | GB | 752345 | | 7/1956 |
| 6,254,845 | B1 | 7/2001 | Ohashi et al. | GB | 896910 | | 5/1962 |
| 6,254,981 | B1 | 7/2001 | Castle | GB | 1062410 | | 3/1967 |
| 6,258,456 | B1 | 7/2001 | Meyer | GB | 1066768 | | 4/1967 |
| 6,360,563 | B1 | 3/2002 | Gerhardt et al. | GB | 1448320 | * | 9/1976 |
| 6,367,288 | B1 | 4/2002 | Lindner et al. | GB | 1493202 | | 11/1977 |
| 6,387,302 | B1 | 5/2002 | Konya et al. | GB | 1493203 | | 11/1977 |
| 6,444,162 | B1 * | 9/2002 | Anshits et al. ........... 264/628 | GB | 1515521 | | 6/1978 |
| 6,461,988 | B2 | 10/2002 | Budd et al. | GB | 1532922 | | 11/1978 |
| 6,486,084 | B2 | 11/2002 | Oda et al. | GB | 2019386 | | 10/1979 |
| 6,506,819 | B1 | 1/2003 | Shukla et al. | GB | 2025928 | | 1/1980 |
| 6,531,222 | B1 * | 3/2003 | Tanaka et al. ........... 428/402 | GB | 1584175 | | 2/1981 |
| 6,551,567 | B2 | 4/2003 | Konya et al. | GB | 2248834 | | 4/1992 |
| 6,572,697 | B2 * | 6/2003 | Gleeson et al. ........... 106/705 | GB | 2256867 | | 12/1992 |
| 6,582,819 | B2 | 6/2003 | McDaniel et al. | GB | 2330138 | | 4/1999 |
| 6,620,487 | B1 * | 9/2003 | Tonyan et al. ........... 428/192 | JP | 4-4104945 | | 4/1992 |
| 6,626,991 | B1 * | 9/2003 | Drochon et al. ........... 106/672 | JP | 07024299 | A2 | 1/1995 |
| 6,630,417 | B2 | 10/2003 | Kawai et al. | JP | 07292846 | A2 | 11/1995 |
| 6,648,961 | B2 * | 11/2003 | Brothers et al. ........... 106/692 | JP | 07315869 | A2 | 12/1995 |
| 6,656,265 | B1 | 12/2003 | Garnier et al. ........... 106/713 | JP | 08169779 | A2 | 7/1996 |
| 6,660,078 | B2 * | 12/2003 | Brothers et al. ........... 106/705 | JP | 09020526 | A | 1/1997 |
| 6,689,286 | B2 | 2/2004 | Wilde et al. | JP | 09067174 | | 3/1997 |
| 6,811,603 | B2 * | 11/2004 | Brothers et al. ........... 106/718 | JP | 09077543 | | 3/1997 |
| 6,814,798 | B2 * | 11/2004 | Vijn et al. ................. 106/724 | JP | 9124327 | A2 | 5/1997 |
| 6,969,422 | B2 | 11/2005 | Mazany et al. | JP | 09255383 | | 9/1997 |
| 7,112,549 | B2 | 9/2006 | Yoshitomi et al. | JP | 10095648 | | 4/1998 |
| 2001/0043996 | A1 * | 11/2001 | Yamada et al. | JP | 10152356 | | 6/1998 |
| 2002/0004111 | A1 * | 1/2002 | Matsubara et al. ......... 428/34.4 | JP | 11116299 | | 4/1999 |
| 2002/0025436 | A1 | 2/2002 | Meyer | JP | 2000119050 | | 4/2000 |
| 2002/0043996 | A1 | 4/2002 | Meyer | JP | 2000143307 | | 5/2000 |
| 2003/0100434 | A1 | 5/2003 | Yoshitomi et al. | JP | 2000302498 | | 10/2000 |
| 2003/0177955 | A1 * | 9/2003 | Vijn et al. ................. 106/724 | JP | 2001163647 | | 6/2001 |
| 2004/0079260 | A1 * | 4/2004 | Datta et al. ............... 106/815 | JP | 2001240439 | | 9/2001 |
| 2004/0080063 | A1 * | 4/2004 | Datta et al. ............... 264/5 | JP | 2002003248 | | 1/2002 |
| 2004/0081827 | A1 * | 4/2004 | Datta et al. ............... 428/384 | JP | 2002037645 | | 2/2002 |
| 2004/0262801 | A1 | 12/2004 | Hojaji et al. | JP | 2002037680 | | 2/2002 |
| 2005/0011412 | A1 * | 1/2005 | Vijn et al. ................. 106/676 | JP | 2002-231865 | | 8/2002 |
| 2008/0095692 | A1 | 4/2008 | Pham | JP | 2003-73756 | | 3/2003 |
| 2008/0096018 | A1 | 4/2008 | Zhang et al. | RU | 2039019 | | 7/1995 |
| 2009/0076196 | A1 | 3/2009 | Hojaji | SU | 1650196 | A | 5/1991 |

FOREIGN PATENT DOCUMENTS

| | | | | | | | |
|---|---|---|---|---|---|---|---|
| | | | | SU | 1724613 | | 4/1992 |
| DE | 3213521 | A1 | 6/1983 | WO | WO 82/03386 | | 10/1982 |
| DE | 3314796 | | 10/1984 | WO | WO 83101947 | | 6/1983 |
| DE | 3908172 | | 2/1990 | WO | WO 85/00361 | | 1/1985 |
| DE | 19962137 | | 6/2001 | WO | WO 85/02394 | | 6/1985 |
| EP | 0033133 | | 8/1981 | WO | WO 87/00827 | | 2/1987 |
| EP | 0036275 | | 9/1981 | WO | WO 90/02102 | | 3/1990 |
| EP | 0102092 | | 3/1984 | WO | WO 92/10440 | | 12/1991 |
| EP | 0159046 | | 10/1985 | WO | WO 95/07177 | | 3/1993 |
| EP | 0159173 | | 10/1985 | WO | WO 96/07538 | | 3/1996 |
| EP | 0242872 | | 4/1987 | WO | WO 98/03284 | | 1/1998 |
| EP | 0247817 | | 12/1987 | WO | WO 98/29353 | | 7/1998 |
| EP | 0430995 | | 6/1991 | WO | WO 01/72863 | | 10/2001 |
| EP | 0593779 | | 4/1994 | WO | WO 2004/018090 | | 3/2004 |
| EP | 0601594 | | 6/1994 | WO | WO 2004/101137 | A1 | 11/2004 |
| EP | 0 359 362 | B1 | 4/1995 | WO | WO 2006/091929 | | 8/2006 |
| EP | 0717675 | | 6/1996 | | | | |

| | | |
|---|---|---|
| WO | WO 07/067774 | 6/2007 |

OTHER PUBLICATIONS

Office Action for U.S. Appl. No. 10/648,585 mailed Jan. 10, 2008.
Office Action for U.S. Appl. No. 10/648,184 mailed Nov. 1, 2007.
Office Action for U.S. Appl. No. 10/648,184 mailed Mar. 20, 2007.
Office Action for U.S. Appl. No. 10/787,894 mailed May 30, 2007.
Sphere Services Inc. "Cenospheres—Hollow Ceramic Microspheres" website article located at: http://www.sphereservices.com/ceno.html (2 pgs.), dated May 15, 2007.
"Technology Education—Glass" by Encyclopedia Britannica (4 pgs.) website article located at: http://www.geocities.com/tech_ed_2000/industrial/manufacturing/glass/glass.htm?20. dated May 15, 2007.
Digital Fire Corporation "Do You Need to Know About Eutectics to Make a Good Glaze?" (4 pgs.) website article located at: http://www.digitalfire.ab.ca/cermat/education/119.php?PHPSESSID=1e2d7f3f3a24698394ecae57ed3b06d5 dated Jul. 14, 2003.
Corning Glass Works "Glass" reprinted version of the Encyclopedia of Chemical Technology (vol. 10) (3 pgs.).
U.S. Appl. No. 11/031,406 filed by EERC—abandoned due to preliminary injunction issued in James Hardie's favor.
U.S. Appl. No. 11/031,829 filed by EERC—abandoned due to preliminary injunction issued in James Hardie's favor.
P.K. Kolay, D.N. Singh, Physical, chemical, mineralogical, and thermal properties of cenospheres from an ash lagoon, Cement and Concrete Research, 2001, pp. 539-542, vol. 31.
What are Cenospheres, www.microspheres.co.za/contents.htm, printed Jul. 11, 2006.
Gubka, Composition and Morphology of Cenospheres Chemical & Physical Properties, www.atom.nw.ru/rie/projects/gubka/properties/cenospheres.shtml, printed Jul. 11, 2006.
Drozhzhin, V.S., Pikulin, I.V., Kuvaev, M.D., Redyushev, S.A., Shpirt, M.Y., Technical Monitoring of Microspheres from Fly Ashes of Electric Power Stations in the Russian Federation, New Products 3 presentation at International Ash Utilization Symposia and the World of Coal Ash Conference, 2005, available at http://whocares-caer uky edu/wasp/AshSymposium/AshLibraryAuthors.asp.
Litigation Documents Corresponding to Civil Case Nos. SCVSS115246, 5:04-CV-00674-RT-SGL, 04-C-1621, 05-CV-44, and 04-CV-152.
Amaral, St., et al., "Passivation of pure iron in alkaline solution containing silicate and sulphate – Galvanostatic and Potentiostatic studies," Corrosion Science, 1999, vol. 34, pp. 383-400.
Drogowska, M., et al, "Influence of anions on the passivity behavior of copper in alkaline solutions," Surface and Coatings Technology, 1988, vol. 34, pp. 383-400.
Hoar, T.P., "The production and breakdown of the passivity of metals," Corrosion Science, 1967, vol. 7, pp. 341-355.
Johnson, C.A., et al., "Leaching Behaviour and Solubility - Controlling Solid Phases of Heavy Metals in Municipal Solid Waste Incinerator Ash," Waste Management, 1996, vol. 16, Nos. 1-3, pp. 129-134.
Joshi, P.S., et al., "Passivation of Carbon Steel Alloy in Deoxygenated Alkaline pH Media. The Effect of Various Additives," Corrosion Science, 1993, vol. 34, No. 8, pp. 1367-1379.
Novakovsky, V.M., "Thermodynamic and Kinetic Causes of Passivity," Electrochimica Acta, 1965, vol. 10, pp. 353-365.
Omurtag, Y., et al., "Some Investigations on the Corrosion Characteristics of Fe-Si alloys," Corrosion Science, 1970, vol. 10, pp. 225-231.
Singh, R., et al., "Stabilization of natural Faujasite zeolite: possible role of alkaline earth metal ions," Microporous and Mesoporous Materials, 1998, vol. 21, pp. 103-109.
Stolica, N., "Pitting Corrosion on Fe-Cr and Fe-Cr-Ni Alloys," Corrosion Science, 1969, vol. 9, pp. 455-470.
Tourky, A.R., et al., "Further Studies on the Effect of C-content on the Corrosion and Passivity of Fe," Corrosion Science, 1968, vol. 8, pp. 857-870.
International Preliminary Report on Patentability and Written Opinion of the International Searching Authority for PCT/US2006/006799, issued Aug. 28, 2007, 11 pages.
Application Ser. No. 10/977,344 entitled Manufacture and Use of Engineered Carbide and Nitride Composites; filed Oct. 29, 2004.
Office Action for JP 529583 dated Aug. 18, 2009, with translations, 18 pp.

\* cited by examiner

SYNTHETIC MICROSPHERES AND METHODS OF MAKING SAME

RELATED APPLICATIONS

This application claims the benefit of U.S. Provisional Application No. 60/405,790, filed on Aug. 23, 2002, and U.S. Provisional Application No. 60/471,400, filed on May 16, 2003, which are hereby incorporated by reference in their entirety.

BACKGROUND OF THE INVENTION

1. Field of the Invention

Embodiments of this invention generally relate to synthetic microspheres and processes for manufacturing the microspheres. These embodiments have been developed primarily to provide a cost-effective alternative to commercially available cenospheres.

2. Description of the Related Art

Any discussion of the prior art throughout the specification should in no way be considered as an admission that such prior art is widely known or forms part of common general knowledge in the field.

Cenospheres are spherical inorganic hollow microparticles found in fly ash, which is typically produced as a by-product in coal-fired power stations. Cenospheres typically make up around 1%-2% of the fly ash and can be recovered or "harvested" from fly ash. These harvested cenospheres are widely available commercially. The composition, form, size, shape and density of cenospheres provide particular benefits in the formulation and manufacture of many low-density products.

One of the characterizing features of cenospheres is their exceptionally high chemical durability. This exceptionally high chemical durability is understood to be largely due to the very low content of alkali metal oxides, particularly sodium oxide, in their composition. Accordingly, low-density composites produced from harvested cenospheres usually have the desirable properties of high strength to weigh ratio and chemical inertness. Chemical inertness is especially important in Portland cement applications, where relative chemical inertness plays an important role in achieving highly durable cementitious products. Thus, harvested cenospheres have proven to be especially useful in building products and in general applications where they may come into contact with corrosive environments where high chemical durability is desirable.

Despite the known utility of harvested cenospheres, their widespread use has been limited to a large extent by their cost and availability. The recovery of cenospheres in large quantities from fly ash is a labor intensive and expensive process. Although it is possible to increase the recovery of cenospheres from fly ash by modifying the collection process, the cost of improved recovery does not make this economically viable.

It may also be possible to alter combustion conditions in power stations to increase the yield of cenospheres in fly ash. However, combustion conditions in power stations are optimized for coal-burning rather than cenosphere production. It is not economically viable to increase the yield of cenosphere production at the expense of coal-burning efficiency.

Several methods for producing synthetic microspheres have also been developed and are described in the prior art. Early methods for manufacturing hollow glass microspheres involved combining sodium silicate and borax with a suitable foaming agent, drying and crushing the mixture, adjusting the size of the crushed particles and subsequently firing the particles. However, these methods suffer from the use of expensive starting materials such as borax. Hence, the resulting microspheres are necessarily expensive. In addition, the product has poor chemical durability due to the presence of a relatively high percentage of sodium oxide in the resulting glass composition.

U.S. Pat. No. 3,752,685 describes a method of producing glass microspheres from Shirasu, a naturally occurring volcanic rock. Upon heating at 800 to 1000° C. finely divided Shirasu forms hollow glass microspheres. However, this method relies on the provision of Shirasu, which is not a widely available starting material.

U.S. Pat. No. 3,365,315 describes a method of producing glass microspheres from glass beads by heating in the presence of water vapor at a temperature of about 1200° C. This method requires the exclusive use of pre-formed amorphous glasses as the starting raw materials.

U.S. Pat. No. 2,978,340 describes a method of forming glass microspheres from discrete, solid particles consisting essentially of an alkali metal silicate. The microspheres are formed by heating the alkali metal silicate at a temperature in the range of 1000-2500° F. in the presence of a gasifying agent, such as urea or $Na_2CO_3$. Again, these alkali silicate microspheres suffer from poor chemical durability due to a high percentage of alkali metal oxides.

U.S. Pat. No. 2,676,892 describes a method of forming microspheres from a Macquoketa clay shale by heating particles of the shale to a temperature of 2500-3500° F. The resulting product undesirably has an open pore structure leading to a relatively high water absorption in an aqueous cementitious environment.

U.S. Patent Publication No. 2001/0043996 (equivalent of EP-A-1156021) describes a spray combustion process for forming hollow microspheres having a diameter of from 1 to 20 microns. However, this process is unsuitable for making hollow microspheres having a diameter similar to that of known cenospheres, which is typically about 200 microns. In spray combustion processes as described in the reference, rapid steam explosion ruptures larger particles thereby preventing formation of hollow microspheres greater than about 20 microns in diameter.

Hence, from the foregoing, it will be appreciated that there is a need for low-cost synthetic microspheres with properties similar to those of microspheres harvested from fly ash. There is also a need for synthetic microspheres with acceptable chemical durability suitable for incorporation into fiber cement compositions. To this end, there is a particular need for a low-cost, high yield process of producing synthetic microspheres from commonly available raw materials. It is an object of the present invention to overcome or ameliorate at least one of the disadvantages of the prior art, or to provide a useful alternative.

SUMMARY OF THE INVENTION

Unless the text clearly requires otherwise, throughout the description and the claims, the words "comprise", "comprising", and the like are to be construed in an inclusive sense as opposed to an exclusive or exhaustive sense; that is to say, in the sense of "including, but not limited to".

As used herein, the term "synthetic hollow microsphere" or "synthetic microsphere" means a microsphere synthesized as a primary target product of a synthetic process other than the coal combustion process.

Although the term "microsphere" is used throughout the specification, it will be appreciated that this term is intended to include any substantially spherical microparticle, including microparticles that are not true geometric spheres.

As used herein, the term "preparing an agglomerate precursor" means a synthetic preparation of an agglomerate precursor by combining the various constituents, for example, by a method described below.

As used herein, the term "primary component" means that this component is the major constituent of the agglomerate precursor, in the sense that the amount of primary component exceeds the amount of any other individual constituent.

In one aspect, the preferred embodiments of the present invention provide a building material incorporating a plurality of synthetic microspheres having an alkali metal oxide content of less than about 10 wt. % based on the weight of the microspheres, wherein the synthetic microspheres are substantially chemically inert. In one embodiment, the building material comprises a cementitious matrix. Preferably, the synthetic microspheres are substantially inert when in contact with the cementitious matrix.

In preferred embodiments, the synthetic microspheres incorporated in the building material have an average particle diameter of between about 30 to 1000 microns. In preferred embodiments, the synthetic microspheres comprise at least one synthetically formed cavity that is substantially enclosed by an outer shell. Preferably, the cavity comprises about 30-95% of the aggregate volume of the microsphere.

In one embodiment, the building material further comprises one or more fibers in the cementitious matrix. Preferably, at least one of the fibers is cellulose fibers. Additionally, the building material can also comprise a hydraulic binder. In one embodiment, the microspheres incorporated in the building material comprise an aluminosilicate material. In another embodiment, the building material further comprises cenospheres derived from coal combustion wherein the average particle diameter of the cenospheres derived from coal combustion substantially equal to the average particle size of the synthetic microspheres. The building material can comprise a pillar, a roofing tile, a siding, a wall, or various other types of building materials.

From the foregoing, it will be appreciated that certain aspects of the preferred embodiments provide a building material that incorporates synthetic microspheres that are substantially chemically inert and dimensioned to be used as a substitute for cenospheres derived from coal combustion. In particular, in certain embodiments, the synthetic microspheres can be used as a low density additive and/or filler material for the building material. These synthetic microspheres can be advantageously incorporated in a cementitious matrix such as a fiber cement building product. These and other objects and advantages of the preferred embodiments of the present invention will become more apparent from the following description taken in conjunction with the following drawings.

DETAILED DESCRIPTION OF THE PREFERRED EMBODIMENTS

Figure 1:
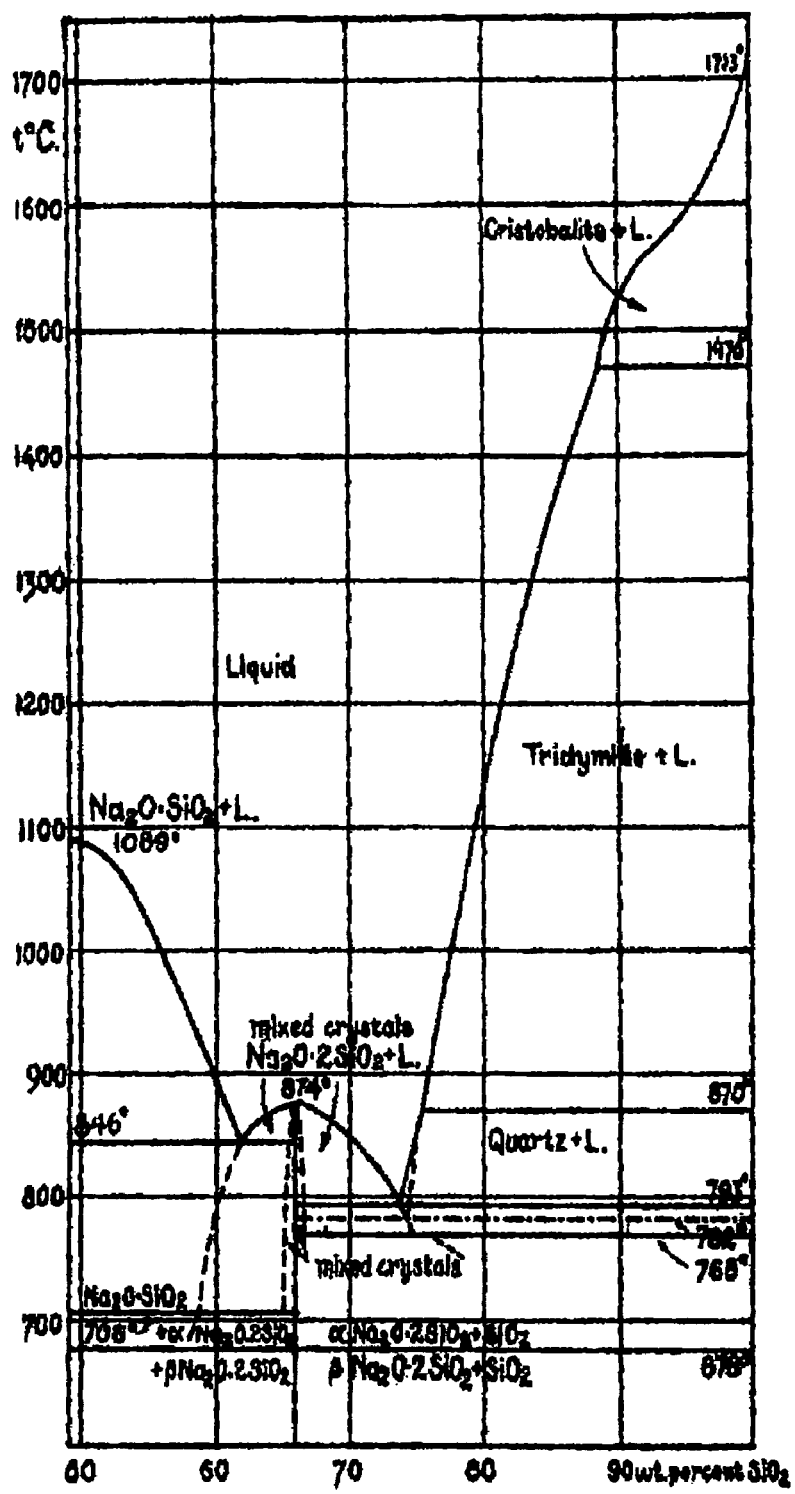
FIG. 1 illustrates a phase equilibrium diagram for binary system $Na_2O$—$SiO_2$, the composition being expressed as a weight percentage of $SiO_2$.

Reference will now be made to the drawings wherein like numerals refer to like parts throughout. As described hereinbelow, the preferred embodiments of the present invention provide a chemically durable, synthetic microsphere having properties and characteristics similar to cenospheres derived from coal combustion. The preferred embodiments also provide a method for manufacturing the microspheres, including raw material composition and processing, and uses for the microspheres in various applications, including fiber cement products.

Synthetic Microspheres

The synthetic microsphere as described herein generally comprises a substantially spherical outer wall and a substantially enclosed cavity or void defined by the wall, resembling the general configuration of harvested cenospheres. However, it will be appreciated that the synthetic microspheres of certain embodiments can be substantially solid. In certain preferred embodiments, the synthetic microsphere has one or more of the following characteristics, which are also generally characteristics of harvested cenospheres:

an aspect ratio of between about 0.8 and 1;

(i) a void volume of between about 30 and 95%, based on the total volume of the microsphere;

(ii) a wall thickness of between about 1 to 100 microns and/or 5 and 50% of the microsphere radius;

(iii) a composition comprising about 30 to 85% $SiO_2$, about 2 to 45 wt. %, preferably about 6 to 40 wt. %, $Al_2O_3$, up to about 30 wt. % divalent metal oxides such as MgO, CaO, SrO, and BaO, about 4 to 10 wt. % monovalent metal oxides such as $Na_2O$, $K_2O$, and up to about 20 wt. % of other metal oxides, including metal oxides which exist in multiple oxidation states such as $TiO_2$ and $Fe_2O_3$;

(iv) a silica to alumina ratio which is greater than about 1;

(v) an average diameter of between about 40 and 500 microns, more preferably between about 50 and 300 microns;

(vi) an outer wall thickness of between about 1 and 50 microns, preferably between about 1 and 30 microns, more preferably between about 2.5 and 20 microns;

(vii) a particle density of between about 0.1 and 20 g/cm$^3$, more preferably between about 0.2 and 1.5 g/cm$^3$, and more preferably between about 0.4 and 1 g/cm$^3$; or (viii) a bulk density of less than about 1.4 g/cm$^3$, preferably less than about 1 g/cm$^3$.

In one embodiment, the synthetic microsphere comprises an aluminosilicate material having an average particle diameter of between about 30 to 1000 microns and an alkali metal oxide content of less than about 10 wt. %, preferably between about 2 to 10 wt. %, based on the total weight of the microsphere. In one preferred embodiment, the total alkali metal oxide content is in the range of about 3 to 9 wt. %, more preferably about 4 to 8 wt. % based on the total weight of the microsphere. In some embodiments, the total alkali metal oxide content of the synthetic microsphere is in the range of about 4 to 6 wt. %, based on the total weight of the microsphere.

The synthetic microsphere may contain several alkali metal oxides, typically a combination of sodium oxide $Na_2O$ and potassium oxide $K_2O$, which make up the total alkali metal content. The majority of the sodium oxide in the synthetic microspheres is typically derived from binding agents (e.g. sodium silicate) used in forming the microspheres as will be described in greater detail below. In one embodiment, the amount of sodium oxide in the synthetic microsphere is preferably in the range of about 2 to 10 wt. %, more preferably about 3 to 9 wt. %, more preferably about 4 to 8 wt. %, and more preferably about 4 to 7 wt. %, based on the total weight of the microsphere. The amount of potassium oxide in the synthetic hollow microspheres is preferably less than about 3 wt. %, more preferably less than about 2 wt. %, and more preferably less than about 1.5 wt. %, based on the total weight of the microsphere.

In certain embodiments, the synthetic microsphere further comprises one or more chemicals used to form the microspheres. For example, the make-up of the wall of the synthetic microsphere may include a binding agent that will be described in greater detail below. Moreover, the synthetic hollow microsphere may also comprise residual amounts of a blowing agent used to form the microsphere as will also be described in greater detail below.

The synthetic microspheres of the preferred embodiments have several advantages over microspheres known in the prior art. Firstly, the synthetic microspheres comprise an aluminosilicate material. Aluminosilicates are inexpensive and widely available throughout the world, for example from a large variety of rocks, clays and minerals and also from waste by-products, particularly bottom ash and fly ash. It is particularly advantageous that the synthetic microspheres can be prepared from fly ash. Secondly, the presence of only moderate quantities of alkali metal oxide provides the microspheres with acceptably high chemical durability and can be used in the same situations as known cenospheres. For example, synthetic microspheres according to preferred forms of the present invention can withstand highly caustic environments and harsh autoclaving conditions as typical of some fiber cement manufacturing processes. By contrast, synthetic microspheres produced according to methods known in the prior art generally contain high amounts of alkali metal oxides and thus have unacceptable low chemical durability.

Furthermore, an average particle diameter of between about 30 and 1000 microns for the synthetic microspheres of the preferred embodiments is advantageous. Particles of this size are known to be relatively safe is building and other materials. When very small particles (e.g. less than about 30 microns) are used in building and other materials, the risk of particulates entering the human respiratory system is greatly increased. This is highly undesirable since it is known that the entry of particulates into the respiratory system is responsible for many potentially fatal diseases, which have been well documented. The risk is increased when composite building materials incorporating the small particles are disturbed, for example, by cutting operations. Hence, the larger average particle diameter of the synthetic microspheres of the embodiments described herein permits the microspheres to be used safely in a range of applications.

As will be described in greater detail below, the synthetic hollow microsphere of certain preferred embodiments can be formed by first preparing an agglomerate precursor, wherein the agglomerate precursor comprises a primary component, a binding agent, and a blowing agent and then firing the precursor at a predetermined temperature profile sufficient to seal the surface of the precursor and activate the blowing agent thereby forming a synthetic hollow microsphere.

Agglomerate Precursor

In certain embodiments, the agglomerate precursor is generally a substantially solid agglomerate mixture comprising a primary component, a binding agent and a blowing agent. Preferably, the amount of primary component comprises about 40 wt. % or more based on the total weight of the agglomerate precursor, more preferably about 50 wt. % or more, more preferably about 70 wt. % or more, more preferably about 80 wt. % or more, and more preferably about 90 wt. % or more. Preferably, the amount of blowing agent comprises about 0.05 to 10 wt. %, based on the total weight of the agglomerate precursor, more preferably about 0.1 to 6 wt. %, more preferably about 0.2 to 4 wt. %. The exact amount of blowing agent will depend on the composition of the primary component, the type of blowing agent and the required density of the final microsphere.

The preferred ratio of primary component to blowing agent will vary, depending on the composition of each of the ingredients. Typically, the ratio of primary component to blowing agent is in the range of about 1000:1 to 10:1, more preferably about 700:1 to 15:1, and more preferably about 500:1 to 20:1.

Preferably, the agglomerate precursor has a water content of about 10 wt. % or less, more preferably about 5 wt. % or less, and more preferably about 3 wt. % or less. The agglomerate precursor is substantially dry, although a small amount of moisture may be present in the agglomerate precursor after a solution-based process for forming the precursor, which is to be described in greater detail below. A small amount of water may also help to bind particles in the agglomerate together, especially in cases where particles in the agglomerate precursor are water-reactive. In some embodiments, when the agglomerate precursor has greater than about 10 wt. % water, such as for example 14 wt. %., it was found that the agglomerate tend to burst into fines during the firing process.

Moreover, the agglomerate precursor preferably has a total alkali metal oxide content of 10 wt. % or less, and typically in the range of about 3 to 10 wt. %, about 4 to 10 wt. % or about 5 to 10 wt. %. A total alkali metal oxide content of about 10 wt. % or less is advantageous, because microspheres formed from such agglomerate precursors will still have acceptably high chemical durability suitable for most applications.

Preferably, the agglomerate is particulate, having an average agglomerate particle diameter in the range of about 10 to 1000 microns, more preferably about 30 to 1000 microns, more preferably about 40 to 500 microns, and more preferably about 50 to 300 microns.

Primary Component

In certain preferred embodiments, the primary component of the agglomerate precursor comprises a low alkali material. The "low alkali material" refers to a material having an alkali metal oxide content of about 10 wt. % or less, more preferably about 8 wt. % or less, and more preferably about 5 wt. % or less. However, in some embodiments, relative high alkali materials may still be included in the primary component. The relative high alkali materials may be combined with low alkali primary component(s) so that the resulting primary component still has a sufficiently low overall alkali metal oxide content. Accordingly, waste glass powders, such as soda lime glasses (sometimes referred to as cullet) having an alkali content of up to 15 wt. % may be included in the primary component. However, when combined with other low alkali primary component(s), the overall alkali concentration of the primary component should be about 10 wt. % or less.

Hitherto, it was believed that relatively large amounts of alkali metal oxides were required to act as a fluxing agent in forming glass microspheres from alkali metal silicates (see, for example, U.S. Pat. No. 3,365,315). However, the present inventors have found a method to form synthetic microspheres from commonly available sources of low alkali content aluminosilicate raw materials without the need for large quantities of additional alkali metal oxides. This will be described in greater detail below.

Aluminosilicate materials are well known to the person skilled in the art. Generally, these are materials having a large component (e.g., greater than about 50 wt. %, preferably greater than about 60 wt. %) of silica ($SiO_2$) and alumina ($Al_2O_3$). The amounts of silica and alumina will vary depending on the source and may even vary within the same source. Fly ash, for example, will contain varying amounts of silica and alumina depending on the type of coal used and combustion conditions. However, the skilled person will readily understand those materials classed as "aluminosilicates".

In one embodiment, the primary component of the precursor comprises at least one aluminosilicate material, preferably about 80 wt. % or more, or about 90 wt. % or more, based on the weight of the primary component. Typically, aluminosilicate materials for use in the embodiments of the present invention have a composition of about 30 to 85 wt. % $SiO_2$; about 2 to 45 wt. % (preferably about 6 to 45 wt. %) $Al_2O_3$; up to about 30 wt. % (preferably up to about 15 wt. %) divalent metal oxides (e.g. MgO, CaO, SrO, BaO); up to about 10 wt. % monovalent metal oxides (e.g. $Li_2O$, $Na_2O$, $K_2O$); and up to about 20 wt. % of other metal oxides, including metal oxides which exist in multiple oxidation states (e.g. $TiO_2$, $Fe_2O_3$, etc.) Preferably, the mass ratio of silica ($SiO_2$) to alumina ($Al_2O_3$) is greater than about 1 in the aluminosilicate materials used in certain embodiments of the present invention.

Methods of the present embodiments are not limited to any particular source of aluminosilicate material. However, the primary component preferably comprises at least one aluminosilicate material selected from fly ash (e.g. Type F fly ash, Type C fly ash, etc.), bottom ash, blast-furnace slag, paper ash, basaltic rock, andesitic rock, feldspars, aluminosilicate clays (e.g. kaolinite clay, illite clay, bedalite clay, betonite clay, china, fire clays, etc.) obsidian, diatomaceous earth, volcanic ash, volcanic rocks, silica sand, silica fume, bauxite, volcanic glasses, geopolymers and combinations thereof. More preferably, the primary component comprises fly ash and/or basaltic rock.

The aluminosilicate material may be either calcined or non-calcined. The term "calcined" means that the aluminosilicate material has been heated in air to a predetermined calcination temperature for a predetermined duration so as to either oxidize or pre-react certain component(s) of the aluminosilicate material. Calcination of the aluminosilicate material may be advantageous in certain embodiments of the present invention since the blowing (expansion) process of the microspheres can be sensitive to the redox state of multivalent oxide(s) present in the aluminosilicate material. Without wishing to be bound by theory, it is believed that activation of the blowing agent is influenced by the release of oxygen from the multivalent oxide(s) present in the aluminosilicate material (e.g., by redox reaction). As an example, a carbonaceous blowing agent may be oxidized to $CO_2$ by ferric oxide ($Fe_2O_3$), which is in turn reduced to ferrous oxide (FeO). The release of $CO_2$ from the blowing agent expands the microspheres. Hence, by pre-calcining the aluminosilicate material in air, the relative amount of ferric oxide is increased, which is then used as a source of oxygen for blowing agents to produce more gas, thereby lowering the density of the microspheres.

In addition, calcination can promote pre-reaction of oxide components and/or cause partial vitrification in the aluminosilicate material, which may be beneficial in the production of high quality synthetic microspheres.

Fly ash is a particularly preferred aluminosilicate primary component due to its low cost and availability. In one preferred form of the invention, the primary component comprises about 5 wt. % or more fly ash, and more preferably about 10 wt. % fly ash or more, based on the total amount of primary component. In another preferred form, the primary component comprises about 50 wt. % fly ash or more, more preferably about 70 wt. % fly ash or more, and more preferably about 90 wt. % fly ash or more, based on the total amount of primary component. In some embodiments of the present invention, the primary component may be substantially all fly ash. Fly ash may also be used in the form of a fly ash geopolymer, which is formed when fly ash is contacted with an aqueous solution of a metal hydroxide such as sodium hydroxide NaOH or potassium hydroxide KOH. Fly ash geopolymers are well known in the art.

In certain embodiments, at least one of the aluminosilicate material used preferably comprises an amorphous phase and is either partially or wholly amorphous. In general, a vitrified material is substantially amorphous.

In certain embodiments, at least one of the aluminosilicate material used preferably has an average primary particle diameter in the range of about 0.01 to 100 microns, more preferably about 0.01 to 100 microns, more preferably about 0.05 to 50 microns, more preferably about 0.1 to 25 microns, and more preferably about 0.2 to 10 microns. Preferred particle diameters may be achieved by appropriate grinding and classification. All types of grinding, milling, and overall size reduction techniques that are used in ceramic industry can be used in embodiments of the present invention. Without limiting to other methods of size reduction used for brittle solids, preferred methods according to embodiments of the present invention are ball milling (wet and dry), high energy centrifugal milling, jet milling, and attrition milling. If more than one aluminosilicate material is to be used, then the multitude of ingredients can be co-ground together. In one method of the present invention, the blowing agent and, optionally the binding agent as will be described in greater detail below, are added to the aluminosilicate material before the milling process. For example all the ingredients can be co-ground together (e.g. in a wet ball mill), which then substantially eliminates the aqueous mixing.

In an alternative embodiment of the present invention, the primary component may include waste material(s) and/or other glass-forming material(s) in addition to the at least one aluminosilicate material. Typical waste materials or other glass-forming material which may be used in this alternative embodiment include waste glasses (e.g. soda lime glasses, borosilicate glasses or other waste glasses), waste ceramics, kiln dust, waste fiber cement, concrete, incineration ash, or combinations thereof. The total amount of waste material and/or other glass-forming material may be up to about 50 wt. % (e.g. up to about 40 wt. %, up to about 30 wt. %, or up to about 20 wt. %), based on the weight of the primary component. As stated above, it is preferred that the total amount of alkali metal oxide in the primary component mixture of this type to still be less than about 10 wt. %.

Blowing Agent

The blowing agent used in embodiments of the present invention is a substance which, when heated, liberates a blowing gas by one or more of combustion, evaporation, sublimation, thermal decomposition, gasification or diffusion. The blowing gas may be, for example, $CO_2$, $CO$, $O_2$, $H_2O$, $N_2$, $N_2O$, $NO$, $NO_2$, $SO_2$, $SO_3$, or mixture Preferably, the blowing gas comprises $CO_2$ and/or $CO$.

Preferably, the blowing agent is selected from powdered coal, carbon black, activated carbon, graphite, carbonaceous polymeric organics, oils, carbohydrates (e.g. sugar, starch, etc.) PVA (polyvinyl alcohol), carbonates, carbides (e.g. silicon carbide, aluminum carbide, and boron carbide, etc.), sulfates, sulfides, nitrides (e.g. silicon nitride, boron nitride, aluminum nitride, etc.), nitrates, amines, polyols, glycols, glycerine or combinations thereof. Carbon black, powdered coal, sugar and silicon carbide are particularly preferred blowing agents.

Preferably, and particularly if the blowing agent is non-water soluble, the blowing agent has an average particle diameter in the range of about 0.01 to 10 microns, more preferably about 0.5 to 8 microns, and more preferably about 1 to 5 microns.

Binding Agent

In preferred embodiment, the agglomerate precursor comprises a binding agent (or binder). The primary function of the binding agent is to bind the particles in the agglomerate together. In some embodiments, the binding agent may act initially to bind particles of the agglomerate together during formation of the agglomerate precursor, and then act as a blowing agent during subsequent firing process.

In general, any chemical substance that is reactive and/or adheres with the aluminosilicate primary component can be used as the binding agent. The binding agent may be any commercially available material used as a binder in the ceramic industry. Preferably, the binding agent is selected from alkali metal silicates (e.g. sodium silicate), alkali metal aluminosilicate, alkali metal borates (e.g. sodium tetraborate), alkali or alkaline earth metal carbonates, alkali or alkaline earth metal nitrates, alkali or alkaline earth metal nitrites, boric acid, alkali or alkaline earth metal sulfates, alkali or alkaline earth metal phosphates, alkali or alkaline earth metal hydroxides (e.g. NaOH, KOH, or Ca(OH)2), carbohydrates (e.g. sugar, starch, etc.), colloidal silica, inorganic silicate cements, Portland cement, alumina cement, lime-based cement, phosphate-based cement, organic polymers (e.g. polyacrylates) or combinations thereof. In some cases, fly ash, such as ultrafine, Type C or Type F fly ash, can also act as a binding agent.

The binding agent and blowing agent are typically different from each other, although in some cases (e.g. sugar, starch, etc.) the same substance may have dual blowing/binding agent properties.

The term "binder" or "binding agent", as used herein, includes all binding agents mentioned above, as well as the in situ reaction products of these binding agents with other components in the agglomerate. For example, an alkali metal hydroxide (e.g. NaOH) will react in situ with at least part of the aluminosilicate material to produce an alkali metal aluminosilicate. Sodium hydroxide may also form sodium carbonate when exposed to ambient air containing $CO_2$, the rate of this process increasing at higher temperatures (e.g. 400° C.). The resulting sodium carbonate can react with the aluminosilicate material to form sodium aluminosilicate.

In certain preferred embodiments, the amount of binding agent is in the range of about 0.1 to 50 wt. % based on the total weight of the agglomerate precursor, more preferably about 0.5 to 40 wt. % and more preferably about 1 to 30 wt. %.

It has been unexpectedly found that the properties of the binder or binding agent, and in particular its melting point, affect the properties of the resulting microspheres. Without wishing to be bound by theory, it is understood by the present inventors that the binder is responsible for forming a molten skin around the agglomerate precursor during or prior to activation of the blowing agent in the firing step as will be described in greater detail below. Hence, in a preferred form of the present invention, the binding agent has a melting point which is lower than the melting point of the whole agglomerate precursor. Preferably, the binding agent has a melting point which is less than about 1200° C. more preferably less than about 1100° C. and more preferably less than about 1000° C. (e.g. 700 to 1000° C.).

It has also been unexpectedly found that the degree of crystallinity in the binder phase can have a pronounced effect on the formation kinetics of the molten skin. The degree of crystallinity at a given temperature may be readily determined from the phase diagram of oxides present in the mixture. For example, in a simple binary system of $SiO_2$ and $Na_2O$, there are three eutectic points, with the lowest one having a liquidus temperature of about 790° C. and a $SiO_2$ to $Na_2O$ ratio of about 3. As sodium oxide concentration is increased, the liquidus temperature increases sharply, to about 1089° C. at a $SiO_2:Na_2O$ ratio of about 1:1. This is illustrated in FIG. 1, which provides a phase diagram of $SiO_2$—$Na_2O$. Most other alkali metal oxides behave similarly to sodium oxide. For example, the $K_2O$—$SiO_2$ system has also several eutectic points, with the lowest at about 750° C. occurring at a $SiO_2$ to $K_2O$ ratio of about 2.1. Similarly, $Li_2O$ has several eutectic points with one at 1028° C. and a ratio of about 4.5.

In standard glass technology, sodium oxide is known to be a strong fluxing agent. Its addition to silicate glasses lowers the melting point and viscosity of the glass. For example, in a typical soda lime glass composition, there is about 15 wt. % sodium oxide, which lowers the melting temperature of $SiO_2$ from about 1700° C. to less than about 1400° C. However, in melting commercial glasses, enough time is given for the melt to reach the equilibrium concentration throughout the glass mass, normally in the order of hours or longer. Thus, in standard glass technology, sufficient sodium oxide and/or other fluxing agents are added so that the whole melt has the requisite viscosity-temperature characteristics.

However, without wishing to be bound by theory, it is understood by the present inventors that, under the fast reaction kinetics of firing (with a temperature increase as fast as 2000° C. second), one of the important requirements for rapid formation of a molten skin around the agglomerate precursor is rapid melting of the binder component. Hence, it is preferred that the binder (present as, for example, sodium silicate or sodium aluminosilicate) has a eutectic or near eutectic composition. Preferably, the binder is sodium silicate having a $SiO_2:Na_2O$ ratio in the range of about 5:1 to about 1:1, more preferably about 4:1 to about 1.5:1, more preferably about 3.5:1 to about 2:1. It will be appreciated that other alkali metal oxides (e.g. $Li_2O$ and $K_2O$) can have the same effect in the binder. However, $Na_2O$ is preferred due to its low cost.

It was unexpectedly found that when sodium silicate with an about 1:1 ratio of $SiO_2:Na_2O$ was used as binder to formulate the agglomerate precursor, relatively dense microspheres with a particle density of about 1 $g/cm^3$ resulted. However, sodium silicate binder with a $SiO_2:Na_2O$ ratio of about 3:1 resulted in microspheres having a lower density of about 0.7 $g/cm^3$. In both cases, the overall concentration of $Na_2O$ relative to the agglomerate was substantially the same. Under the principles of traditional glass-making technology, it would have been expected that there would be little or no difference in the final products when using the same amount of fluxing agent. However, the present inventors have found that using a eutectic or near eutectic composition in the binder, a molten skin is formed rapidly during firing, and low density microspheres result, irrespective of the total amount of fluxing agent in the agglomerate.

Equally unexpected, it was found that sodium hydroxide showed substantially the same trend. Sodium oxide, when used as a binder, reacts with silica present in aluminosilicate powders to form a compound of sodium silicate. As more sodium hydroxide is added, the ratio of silica to sodium oxide is lowered, resulting in binders with progressively higher melting temperatures.

Furthermore, the properties of the synthetic microspheres may also be dependent on the drying temperature of the agglomerate, and to some extent, the pressure. For example, a high drying temperature favors formation of sodium silicate having a lower $SiO_2:Na_2O$ ratio, thereby giving a binder having a higher melting temperature. For example, about 5 wt. % of NaOH was found to be an appropriate amount of binder for forming low density microspheres when the agglomerate was dried at about 50° C. However, a substantially identical formulation resulted in higher density microspheres when the agglomerate was dried at about 400° C. It was surprisingly found that, when the agglomerate was dried at about 400° C. a lower concentration of NaOH (e.g. about 2-3 wt. %) was required to produce low density microspheres.

Traditionally, it was believed that a relatively high amount (e.g. 15 wt. %) of sodium oxide was necessary in glass-making technology to act as a fluxing agent. However, in certain embodiments of the present invention, it was surprisingly found that relatively high amounts of sodium oxide are actually less preferred.

The agglomerate precursor may also include surfactants, which assist in dispersion of the agglomerate precursor components into an aqueous solution or paste. The surfactants may be anionic, cationic or non-ionic surfactants.

As described above, once the agglomerate precursor is formed, it is fired at a predetermined temperature profile sufficient to seal the surface of the precursor and activate the blowing agent.

Methods of Forming the Synthetic Microspheres

As described above, the synthetic microspheres of certain preferred embodiments can be formed by first combining the primary component with a binding agent and a blowing agent so as to form an agglomerate precursor in a manner to be described in greater detail below. For the formation of substantially solid microspheres, the blowing agent can be left out. The agglomerate precursor is then fired at a pre-determined temperature profile sufficient to activate the blowing agent to release a blowing gas, thereby forming a microsphere with at lease one substantially enclosed void. In embodiments for forming solid synthetic microspheres, the agglomerate precursor is fired at a pre-determined temperature profile that will adequately combine the primary component with the binding agent.

In certain preferred embodiments, the temperature profile used in the firing step substantially fuses the precursor into a melt, reduces the viscosity of the melt, seals the surface of the precursor and promotes expansive formation of gas within the melt to form bubbles. The temperature profile preferably should maintain the melt at a temperature and time sufficient to allow gas bubbles to coalesce and form a primary void. After foaming or formation of the primary void, the newly expanded particles are rapidly cooled, thus forming hollow glassy microspheres. In one embodiment, the temperature profile is preferably provided by a furnace having one or more temperature zones, such as a drop tube furnace, a vortex type furnace, a fluidized bed furnace or a fuel fired furnace, with upward or downward draft air streams. A fuel fired furnace used in certain preferred embodiments of the present invention includes furnace types in which agglomerated precursors are introduced directly into one or a multitude of combustion zones, to cause expansion or blowing of the particles. This is a preferred type of furnace, since the particles benefit by direct rapid heating to high temperatures, which is desirable. The heat source may be electric or provided by burning fossil fuels, such as natural gas or fuel oil. One preferred method of heating is by combustion of natural gas, since this is more economical than electric heating and cleaner than burning fuel oil.

Typically, the peak firing temperature in the firing step is in the range of about 600 to 2500° C. more preferably about 800 to 2000° C. more preferably about 1000 to 1500° C. and more preferably about 1100 to 1400° C. However, it will be appreciated that the requisite temperature profile will typically depend on the type of aluminosilicate primary component and blowing agent used. Preferably, the exposure time to the peak firing temperatures described above will be for a period of about 0.05 to 20 seconds, more preferably about 0.1 to 10 seconds.

Method of Forming Agglomerate Precursor

Figure 2:
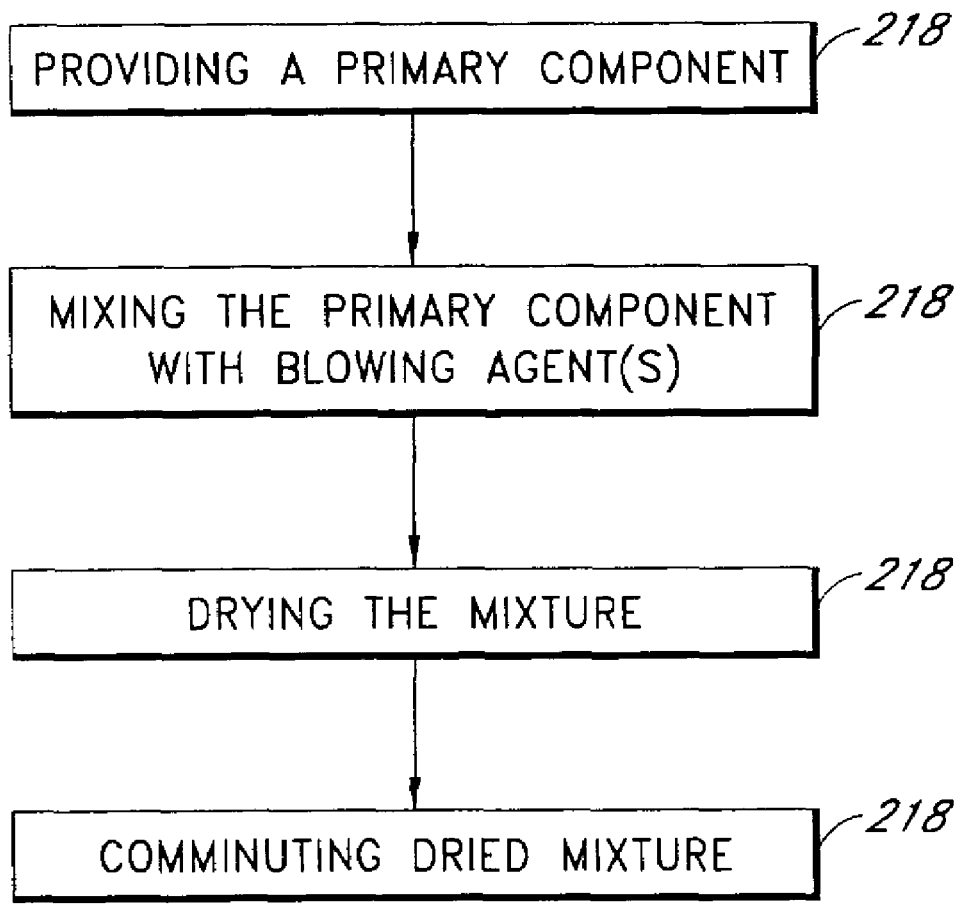
FIG. 2 is a schematic illustration of one preferred method of producing the agglomerate precursor of one embodiment of the present invention.

As described above, preferred embodiments of the present invention also provide methods of preparing an agglomerate precursor that is suitable for forming a synthetic hollow microsphere therefrom. FIG. 2 provides a schematic illustration of one preferred method 200 of forming the agglomerate precursor.

As shown in FIG. 2, the method 200 begins with Step 202, which comprises providing a primary component of a predetermined size. Preferably, the primary component comprises at least one aluminosilicate material. Preferably, the amount of primary component is greater than about 40 wt. % based on the total dry weight of the agglomerate precursor. Preferably, the amount of blowing agent is less than about 10 wt. % based on the total dry weight of the agglomerate precursor. Further preferred forms of the primary component and blowing agent are described above.

As shown in FIG. 2, the method 200 continues with Step 204, which comprises mixing the primary component with a blowing agent in water. In certain preferred embodiments, a binding agent is additionally mixed with the primary component and the blowing agent in Step 204. Preferably, the amount of binding agent is in the range of about 0.1 to 50 wt. %, based on the total dry weight of the agglomerate precursor. Further preferred forms of the binding agent are described above.

Other additives (e.g. surfactants) may also be added in the mixing Step 204, as appropriate. Surfactants may used to assist with mixing, suspending and dispersing the particles. Typically, Step 204 provides an aqueous dispersion or paste, which is dried in subsequent steps. Mixing can be performed by any conventional means, such that those used to blend ceramic powders. Examples of preferred mixing techniques include, but are not limited to, agitated tanks, ball mills, single and twin screw mixers, and attrition mills.

Subsequent to the mixing process in Step 204, the method 200 continues with Step 206, in which the mixture is dried. Drying may be performed at a temperature in the range of about 30 to 600° C. and may occur over a period of up to about 48 hours, depending on the drying technique employed. Any type of dryer customarily used in industry to dry slurries and pastes may be used. Drying may be performed in a batch process using, for example, a stationary dish or container. Alternatively, drying may be performed in a fluid bed dryer, rotary dryer, rotating tray dryer, spray dryer or flash dryer. Alternatively, drying may also be performed using a microwave oven. It will be readily appreciated that the optimum drying period will depend on the type of drying method employed.

When drying is performed in a stationary dish or container, it is preferred that the drying temperature is initially not set too high in order to avoid water in the mixture boiling violently and thus spewing solids out of the drying container. In this case, the drying temperature, at least initially, is preferably in the range of about 30 to 100° C. and more preferably about 40 to 80° C. to avoid initial, rapid boiling of water. However, after initial evaporation of water, the drying temperature may be increased to temperatures up to about 350° C. which completes the drying process more speedily.

As shown in FIG. 2, the method 200 of forming the agglomerate precursor further includes Step 208, which comprises comminuting the dried mixture from Step 206 to form agglomerate precursor particles of a predetermined particle diameter range. However, in some embodiments, the drying Step 206 and comminuting Step 208 may be performed in a single step. Preferably, the dried mixture is comminuted to provide agglomerate precursor particles having an average particle diameter in the range of about 10 to 1000 microns, more preferably about 30 to 1000 microns, more preferably about 40 to 500 microns, and more preferably about 50 to 300 microns. The particle diameter of the agglomerate precursor will affect the particle diameter of the resultant synthetic hollow microsphere, although the degree of correspondence will, of course, only be approximate.

It is preferred that preferred embodiments of the present invention provide synthetic hollow microspheres having a controlled particle diameter distribution. Accordingly, the comminuted agglomerate precursor may be classified to a predetermined particle diameter distribution. Alternatively, a controlled particle diameter distribution in the agglomerate precursor may be achieved by the use of spray dryer in the drying Step 206. Spray drying has the additional advantage of allowing a high throughput of material and fast drying times. Hence, in one preferred embodiment of the present invention, the drying Step 206 is performed using a spray dryer. Spray dryers are described in a number of standard textbooks (e.g. *Industrial Drying Equipment*, C. M. van't Land; *Handbook of Industrial Drying 2$^{nd}$ Edition*, Arun S. Mujumbar) and will be well known to the skilled person. The use of a spray dryer in the preferred embodiments of the present invention has been found to substantially eliminate the need for any sizing/classification of the agglomerate precursor.

Preferably, the aqueous slurry feeding the spray dryer comprises about 20 to 90 wt. % solids, more preferably about 25 to 75 wt. % solids, and more preferably about 60 to 70 wt. % solids. In addition to the agglomerate ingredients described above, the slurry may contain further processing aids or additives to improve mixing, flowability or droplet formation in the spray dryer. Suitable additives are well known in the spray drying art. Examples of such additives are sulphonates, glycol ethers, hydrocarbons, cellulose ethers and the like. These may be contained in the aqueous slurry in an amount ranging from about 0 to 5 wt. %.

In the spray drying process, the aqueous slurry is typically pumped to an atomizer at a predetermined pressure and temperature to form slurry droplets. The atomizer may be, for example, an atomizer based on a rotating disc (centrifugal atomization), a pressure nozzle (hydraulic atomization), or a two-fluid pressure nozzle wherein the slurry is mixed with another fluid (pneumatic atomization). The atomizer may also be subjected to cyclic mechanical or sonic pulses. The atomization may be performed from the top or from the bottom of the dryer chamber. The hot drying gas may be injected into the dryer co-current or counter-current to the direction of the spraying.

The atomized droplets of slurry are dried in the spray dryer for a predetermined residence time. Typically, the residence time in the spray dryer is in the range of about 0.1 to 10 seconds, with relatively long residence times of greater than about 2 seconds being generally more preferred. Preferably, the inlet temperature in the spray dryer is in the range of about 300 to 600° C. and the outlet temperature is in the range of about 100 to 220° C.

Use of Synthetic Hollow Microspheres

The synthetic hollow microspheres according preferred embodiments of the present invention may be used in a wide variety of applications, for example, in filler applications, modifier applications, containment applications or substrate applications. The scope of applications is much greater than that of harvested cenospheres due to the low cost and consistent properties of synthetic microspheres.

Synthetic microspheres according to the present invention may be used as fillers in composite materials, where they impart properties of cost reduction, weight reduction, improved processing, performance enhancement, improved machinability and/or improved workability. More specifically, the synthetic microspheres may be used as fillers in polymers (including thermoset, thermoplastic, and inorganic geopolymers), inorganic cementitious materials (including material comprising Portland cement, lime cement, alumina-based cements, plaster, phosphate-based cements, magnesia-based cements and other hydraulically settable binders), concrete systems (including precise concrete structures, tilt up concrete panels, columns, suspended concrete structures etc.), putties (e.g. for void filling and patching applications), wood composites (including particleboards, fibreboards, wood/polymer composites and other composite wood structures), clays, and ceramics. One particularly preferred use of the microspheres according to the present invention is in fiber cement building products. with other materials. By appropriate selection of size and geometry, the microspheres may be combined with certain materials to provide unique characteristics, such as increased film thickness, improved distribution, improved flowability etc. Typical modifier applications include light reflecting applications (e.g. highway markers and signs), industrial explosives, blast energy absorbing structures (e.g. for absorbing the energy of bombs and explosives), paints and powder coating applications, grinding and blasting applications, earth drilling applications (e.g. cements for oil well drilling), adhesive formulations and acoustic or thermal insulating applications.

The synthetic microspheres may also be used to contain and/or store other materials. Typical containment applications include medical and medicinal applications (e.g. microcontainers for drugs), micro-containment for radioactive or toxic materials, and micro-containment for gases and liquids.

The synthetic microspheres may also be used in to provide specific surface activities in various applications where surface reactions are used (i.e. substrate applications). Surface activities may be further improved by subjecting the synthetic microspheres to secondary treatments, such as metal or ceramic coating, acid leaching etc. Typical substrate applications include ion exchange applications (for removing contaminants from a fluid), catalytic applications (in which the surface of the microsphere is treated to serve as a catalyst in synthetic, conversion or decomposition reactions), filtration (where contaminants are removed from gas or liquid streams), conductive fillers or RF shielding fillers for polymer composites, and medical imaging.

In one embodiment, the synthetic microspheres of preferred embodiments of the present invention are incorporated in a building material. The synthetic microspheres can be incorporated in a composite building material as an additive, low density filler, and/or the like. In one embodiment, the synthetic hollow microspheres are incorporated in a cementitious material. Due in large part to the low alkali metal oxide content (e.g. less than 10 wt. %) of the synthetic microspheres, the microspheres are substantially chemically inert when in contact with the caustic cementitious material.

The synthetic microspheres of preferred embodiments can be incorporated in a building material formulation comprising a hydraulic binder, one or more fibers (e.g. cellulose fibers) For example, the synthetic microspheres can be incorporated as a low density additive in a fiber cement building material as described in U.S. Pat. No. 6,572,697, which is incorporated by reference herein in its entirety. Advantageously, the synthetic microspheres can serve as a substitute for harvested cenospheres in all applications because of the synthetic microspheres have substantially the same properties as the cenospheres.

However, in certain embodiments, the synthetic microspheres can be manufactured with properties that are superior to that of cenospheres derived from coal combustion. For example, in some embodiments, the average aspect ratio of the synthetic microspheres is closer to 1 than the average aspect ratio of cenospheres, derived from coal combustion, thus providing a microsphere that is more spherical. Moreover, in some embodiments, the average standard deviation of the wall thickness of the synthetic hollow microspheres is less than that of cenospheres, derived from coal combustion, which provides a product with a more uniform appearance. These improved properties are achieved through controlling the processing conditions and raw material in manufacturing the microspheres.

The following examples illustrate some preferred methods of making the synthetic hollow microspheres of preferred embodiments of the present invention.

EXAMPLE 1

This example illustrates a method of making synthetic microspheres from formulations comprising fly ash, sodium silicate, and sugar.

Three samples were made by mixing a type F fly ash (ground to an average size of about 5.4 microns) with a commercial grade sodium silicate solution ($SiO_2/Na_2O$ is about 3.22, about 40% solid content), a commercial grade sugar, and water. The amounts of ingredients are given in Table 1. The composition of fly ash is given in Table 2. The mixtures were blended into homogeneous slurry, poured into a flat dish and allowed to solidify at room temperature for about 5 minutes.

Figure 3:
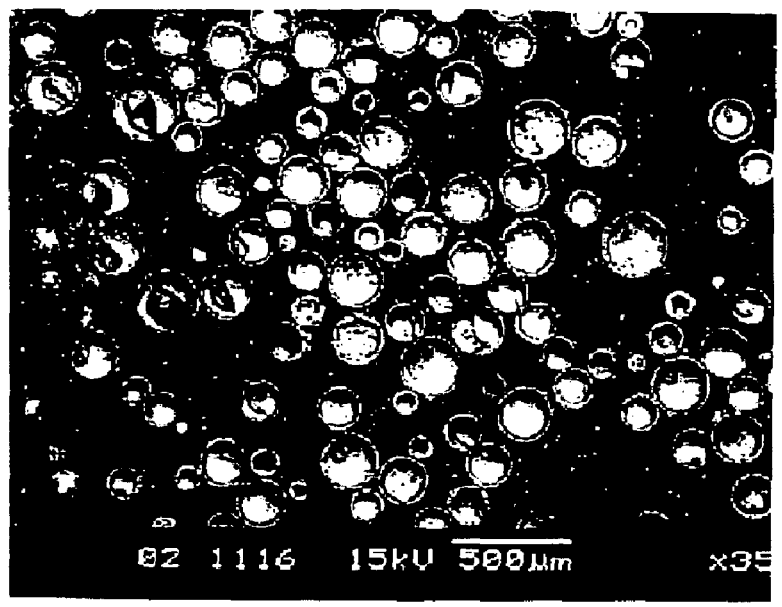
FIG. 3 is a scanning electron micrograph of synthetic hollow microspheres obtained from Example 1 (Sample 1)
Figure 4:
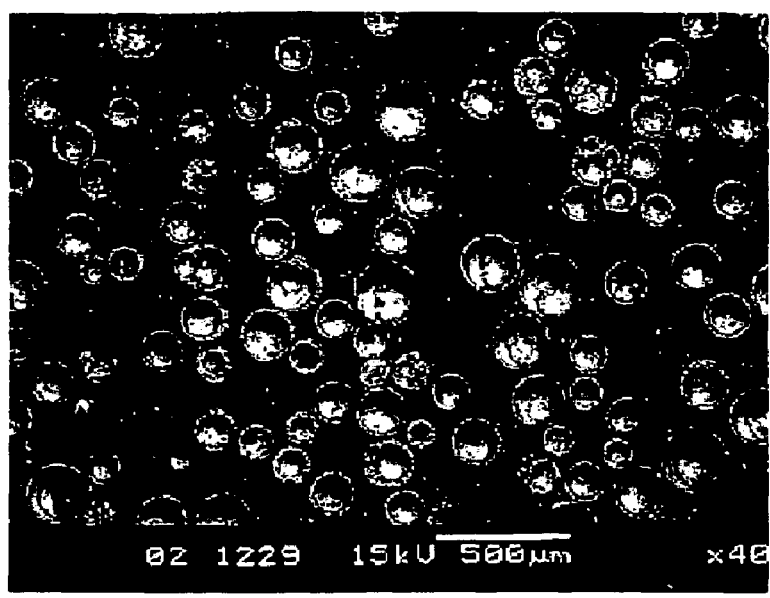
FIG. 4 is a scanning electron micrograph of synthetic hollow microspheres obtained from Example 1 (Sample 2)
Figure 5:
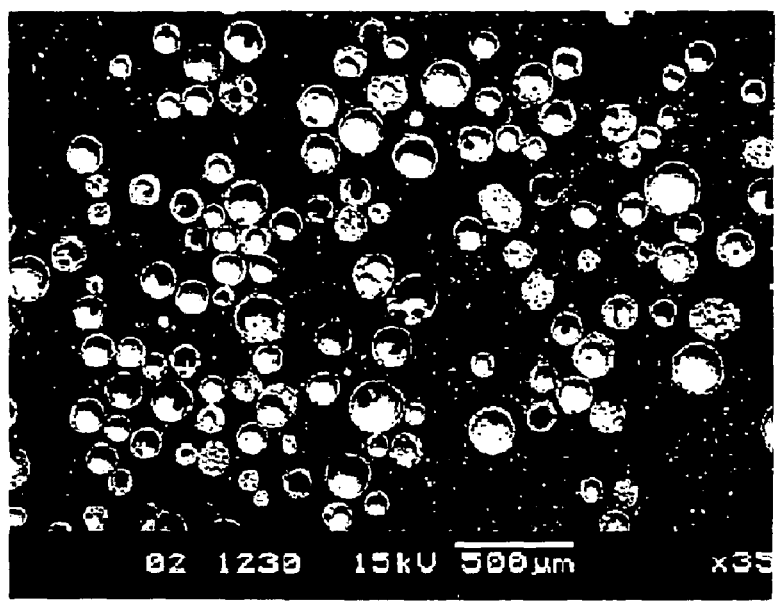
FIG. 5 is a scanning electron micrograph of synthetic hollow microspheres obtained from Example 1 (Sample 3)

The resulting products were further dried at about 50° C. for about 20 hours, after which they were ground and sieved to obtain powders within a size range of about 106 to 180 microns. In the next step, for each sample, the powders were fed into a vertical heated tube furnace at an approximate feed rate of about 0.14 grams/min. The gas flow inside the tube furnace was about 1 litre of air plus 3 litres of nitrogen per minute. The constant temperature zone of the furnace was adjusted to provide residence times from less than second to approximately a few seconds at the peak firing temperatures. The foamed microspheres were collected on a funnel shaped collecting device covered with a fine mesh screen positioned at the bottom part of the furnace. A mild suction was applied to the end of funnel to aid in collecting the microspheres. The products were characterized for particle density (e.g. apparent density), percent of water flotation, and approximate particle diameter distribution. The results for various firing temperatures and residence times are summarized in table 3. FIGS. 3 to 5 show the cross sections of the products.

TABLE 1

| Sample No. | Fly ash | Sodium silicate solution | Sugar | Water |
|---|---|---|---|---|
| 1 | 93.1 | 58.0 | 3.6 | 7.0 |
| 2 | 104.8 | 29.1 | 3.6 | 19.2 |
| 3 | 108.0 | 21.0 | 3.6 | 21.0 |

All masses are in grams

TABLE 2

| LOI | $SiO_2$ | $Al_2O_3$ | $Fe_2O_3$ | CaO | MgO | $SO_3$ | $Na_2O$ | $K_2O$ | $TiO_2$ | $Mn_2O_3$ | $P_2O_5$ | Total |
|---|---|---|---|---|---|---|---|---|---|---|---|---|
| 0.39 | 50.63 | 21.14 | 7.62 | 12.39 | 3.61 | 0.66 | 0.63 | 1.27 | 1.30 | 0.17 | 0.14 | 99.95 |

All amounts are in percentage of weight

TABLE 3

| Sample No. | Temperature (degree C.) | Residence time (second) | Apparent density (g/cm³) | Water float (%) | Size of microspheres (micron) |
|---|---|---|---|---|---|
| 1 | 1300 | 0.6-1.1 | 0.64 | 81 | 100-275 |
| 1 | 1300 | 0.8-1.5 | 0.78 | | |
| 2 | 1300 | 0.6-1.1 | 0.87 | 55 | 110-240 |
| 3 | 1300 | 0.6-1.1 | 1.05 | | 75-225 |

EXAMPLE 2

This example illustrates a method of making synthetic microspheres from formulations comprising fly ash, sodium silicate, and carbon black.

Figure 6:
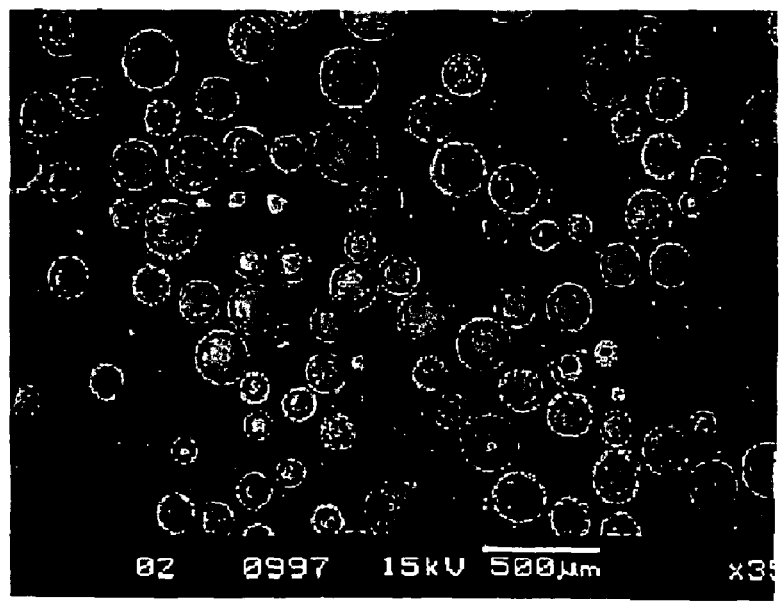
FIG. 6 is a scanning electron micrograph of synthetic hollow microspheres obtained from Example 2 (Sample 4)
Figure 7:
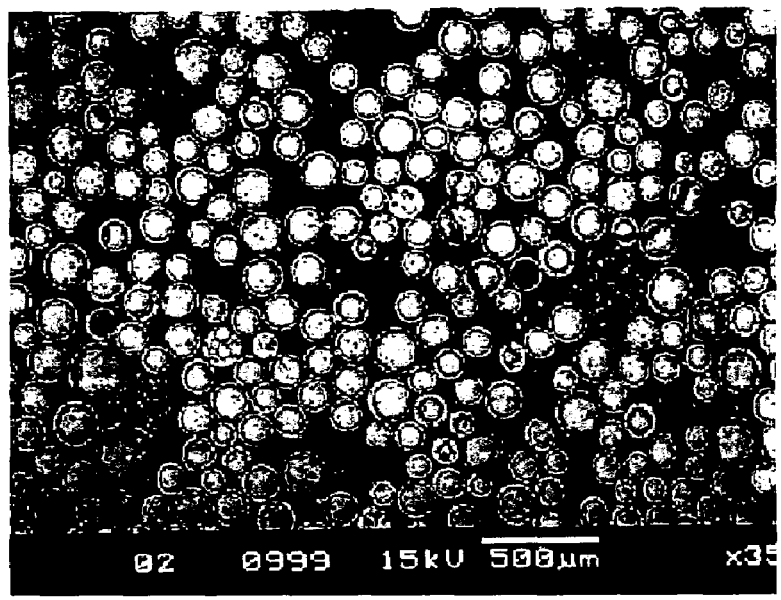
FIG. 7 is a scanning electron micrograph of synthetic hollow microspheres obtained from Example 2 (Sample 5)
Figure 8:
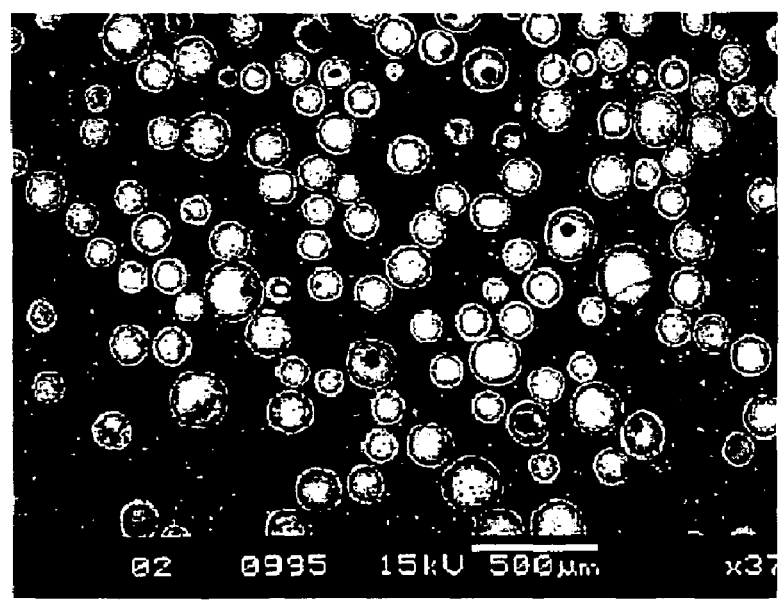
FIG. 8 is a scanning electron micrograph of synthetic hollow microspheres obtained from Example 2 (Sample 6)

Three samples were made by mixing a type F fly ash (ground to an average size of about 5.4 microns) with a commercial grade sodium silicate solution ($SiO_2/Na_2O$ is about 3.22, about 40% solid content), a commercial grade carbon black, and water. The amounts of ingredients are given in Table 4. The composition of fly ash is given in Table 2. Each mixture was blended into homogeneous slurry, poured into a flat dish and allowed to solidify at room temperature for about 5 minutes. The resulting products were further dried at about 50° C. for about 20 hours, after which they were ground and sieved to obtain powders within a size range of 106 to 180 microns. In the next step, for each sample, the powders were fed into a vertical heated tube furnace at an approximate feed rate of about 0.14 grams/min. The gas flow inside the tube furnace is about 1 litre of air plus 3 litres of nitrogen per minute. The constant temperature zone of the furnace was adjusted to provide residence times from less than a second to approximately a few seconds at the peak firing temperatures. The foamed microspheres were collected on a funnel shaped collecting device covered with a fine mesh screen positioned at the bottom part of the furnace. A mild suction was applied to the end of funnel to aid in collecting the microspheres. The products were characterized for particle density (e.g. apparent density), percent of water floatation, and approximate particle diameter distribution. The results for various firing temperatures and residence times are summarized in Table 5. FIGS. 6 to 8 show the cross sections of the products.

TABLE 4

| Sample No. | Fly ash | Sodium silicate solution | Carbon black | Water |
|---|---|---|---|---|
| 4 | 95.0 | 59.0 | 1.2 | 7.1 |
| 5 | 100.8 | 45.0 | 1.2 | 18.4 |
| 6 | 106.8 | 30.0 | 1.2 | 30.1 |

All masses are in grams

TABLE 5

| Sample No. | Temperature (degree C.) | Residence time (second) | Apparent density (g/cm³) | Water float (%) | Size of microspheres (micron) |
|---|---|---|---|---|---|
| 4 | 1300 | 0.6-1.1 | 0.87 | 70 | 100-275 |
| 5 | 1300 | 0.6-1.1 | 0.75 | 71 | 100-275 |
| 6 | 1300 | 0.6-1.1 | 0.86 | 67 | 110-260 |

EXAMPLE 3

This example illustrates a method of making synthetic microspheres form formulations comprising fly ash, sodium hydroxide, and carbon black.

Figure 9:
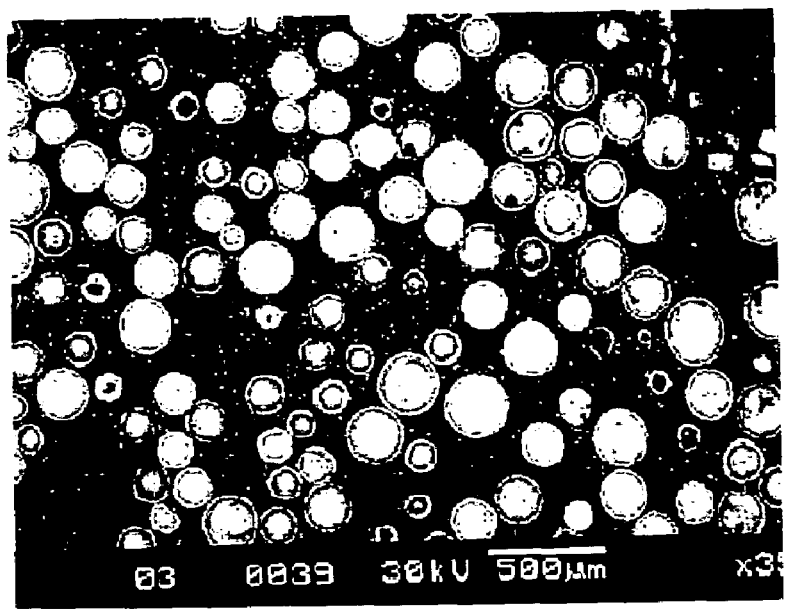
FIG. 9 is a scanning electron micrograph of synthetic hollow microspheres obtained from Example 3 (Sample 7)

Three samples were made by mixing a type F fly ash (ground to an average size of about 5.4 microns) with a commercial grade solid sodium hydroxide (flakes), a commercial grade carbon black, and water. The amounts of ingredients are given in Table 6. The composition of fly ash is given in Table 2. Each mixture was blended into homogeneous slurry, poured into a flat dish and allowed to solidify at room temperature for about 5 minutes. The resulting products were further dried at about 50° C. for about 20 hours, after which it was ground and sieved to obtain powders within a size range of about 106 to 180 microns. In the next step, the powders were fed into a vertical heated tube furnace at an approximate feed rate of about 0.14 grams/min. The gas flow inside the tube furnace is about 1 litre of air plus 3 litres of nitrogen per minute. The constant temperature zone of the furnace was adjusted to provide residence times from less than a second to approximately few seconds at the peak firing temperatures. The foamed microspheres were collected on a funnel shaped collecting device covered with a fine mesh screen positioned at the bottom part of the furnace. A mild suction was applied to the end of funnel to aid in collecting the microspheres. The products were characterized for particle density (e.g. apparent density), percent of water floatation, and approximate particle diameter distribution. The results are summarized in Table 7. FIG. 9 shows the cross section of the product obtained from Sample 7.

TABLE 6

| Sample No. | Fly ash | Sodium hydroxide | Carbon black | Water |
|---|---|---|---|---|
| 7 | 112.8 | 6.0 | 1.2 | 39.5 |
| 8 | 116.4 | 2.4 | 1.2 | 46.6 |
| 9 | 117.6 | 1.2 | 1.2 | 47.0 |

All masses are in grams

TABLE 7

| Sample No. | Temperature (degree C.) | Residence time (second) | Apparent density (g/cm³) | Water float (%) | Size of microspheres (micron) |
|---|---|---|---|---|---|
| 7 | 1300 | 0.6-1.1 | 0.65 | 77 | 85-290 |
| 8 | 1300 | 0.6-1.1 | 0.76 | | |
| 9 | 1300 | 0.6-1.1 | 0.78 | 66 | |

EXAMPLE 4

This example illustrates a method to make synthetic microspheres form formulations consisting of fly ash, basalt, sodium hydroxide, and carbon black.

Figure 10:
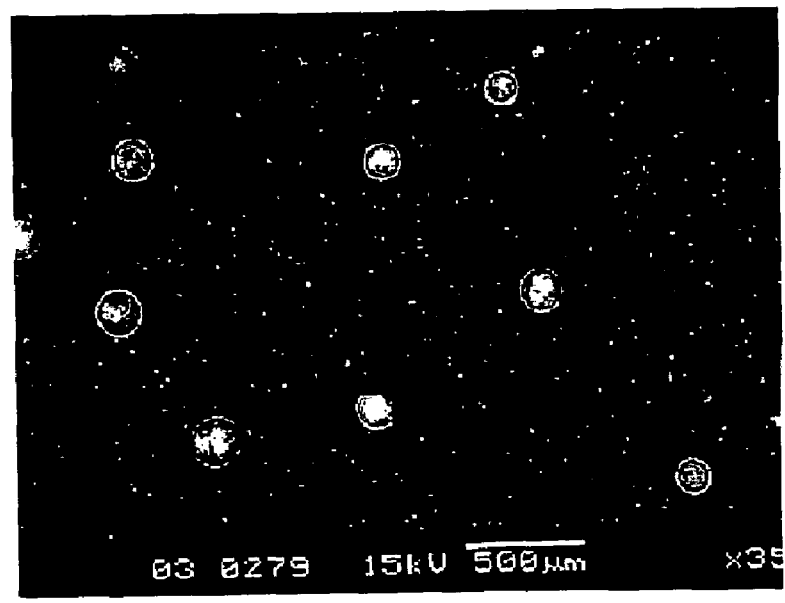
FIG. 10 is a scanning electron micrograph of synthetic hollow microspheres obtained from Example 4 (Sample 12)
Figure 11:
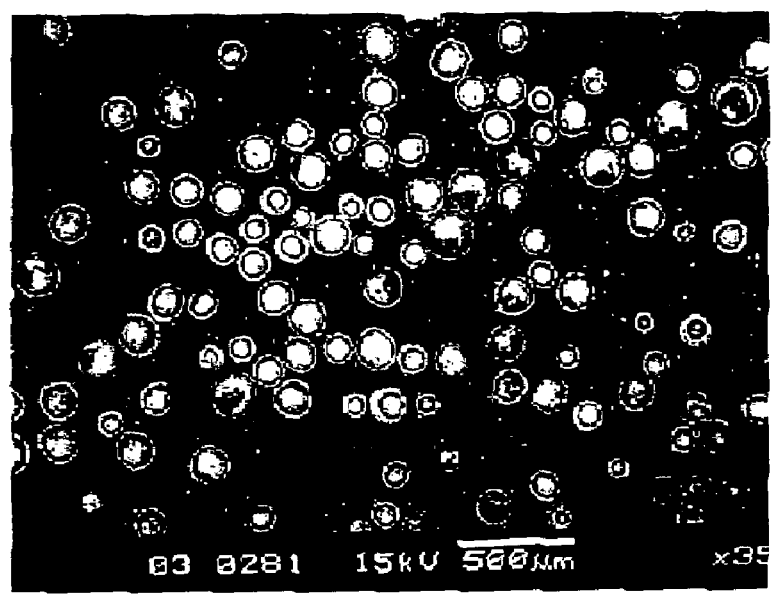
FIG. 11 is a scanning electron micrograph of synthetic hollow microspheres obtained from Example 4 (Sample 13)

About 94 grams of a type F fly ash and basalt co-ground to an average size of about 1 micron were mixed with about 5 grams of solid sodium hydroxide (flakes), about 1 gram of a commercial grade carbon black, and about 38 ml of water. Several samples were made by changing the proportions of basalt to fly ash as shown in Table 8. The compositions of fly ash and basalt are given in Tables 2 and 9 respectively. Each mixture was blended into an homogeneous slurry, poured into a flat dish and allowed to solidify at room temperature for out 5 minutes. The resulting product was further dried at about 50° C. for about 20 hours, after which it was ground and sieved to obtain powders within a size range of about 106 to 180 microns. In the next step, the powders were fed into a vertical heated tube furnace at an approximate feed rate of about 0.14 grams/min. The gas flow inside the tube furnace is about 1 litre of air plus 3 litres of nitrogen per minute. The constant temperature zone of the furnace was adjusted to provide residence times from less than a second to approximately few seconds at the peak firing temperatures. The foamed microspheres were collected on a funnel shaped collecting device covered with a fine mesh screen positioned at the bottom part of the furnace. A mild suction was applied to the end of funnel to aid in collecting the microspheres. The products were characterized for particle density (e.g. apparent density), percent of water floatation, and approximate particle diameter distribution. The results are summarized in Table 10. FIGS. 10 and 11 show the cross section of the products of Samples 12 and 13 respectively.

TABLE 8

| Sample No. | Fly ash | Basalt | Sodium hydroxide | Carbon black | Water |
|---|---|---|---|---|---|
| 10 | 75.2 | 18.8 | 5.0 | 1.0 | 38.0 |
| 11 | 56.4 | 37.6 | 5.0 | 1.0 | 38.0 |
| 12 | 37.6 | 56.4 | 5.0 | 1.0 | 38.0 |
| 13 | 18.8 | 75.2 | 5.0 | 1.0 | 38.0 |

All masses are in grams

TABLE 9

| LOI | $SiO_2$ | $Al_2O_3$ | $Fe_2O_3$ | CaO | MgO | $SO_3$ | $Na_2O$ | $K_2O$ | $TiO_2$ | $Mn_2O_3$ | $P_2O_5$ | Total |
|---|---|---|---|---|---|---|---|---|---|---|---|---|
| 0 | 46.13 | 15.81 | 9.50 | 9.50 | 9.60 | 0 | 2.78 | 1.53 | 2.38 | 0.25 | 0.59 | 98.07 |

All amounts are in percentage of weight

TABLE 10

| Sample No. | Temperature (degree C.) | Residence time (second) | Apparent density (g/cm$^3$) | Water float (%) | Size of microspheres (micron) |
|---|---|---|---|---|---|
| 10 | 1300 | 0.8-1.5 | 0.76 | 62 | |
| 11 | 1300 | 0.8-1.5 | 0.77 | 63 | |
| 12 | 1300 | 0.8-1.5 | 0.76 | 65 | 100-250 |
| 13 | 1300 | 0.8-1.5 | 1.00 | 44 | 100-225 |

EXAMPLE 5

This example illustrates a method to make synthetic microspheres form a ation comprising basalt, sodium hydroxide, and silicon carbide.

Figure 12:
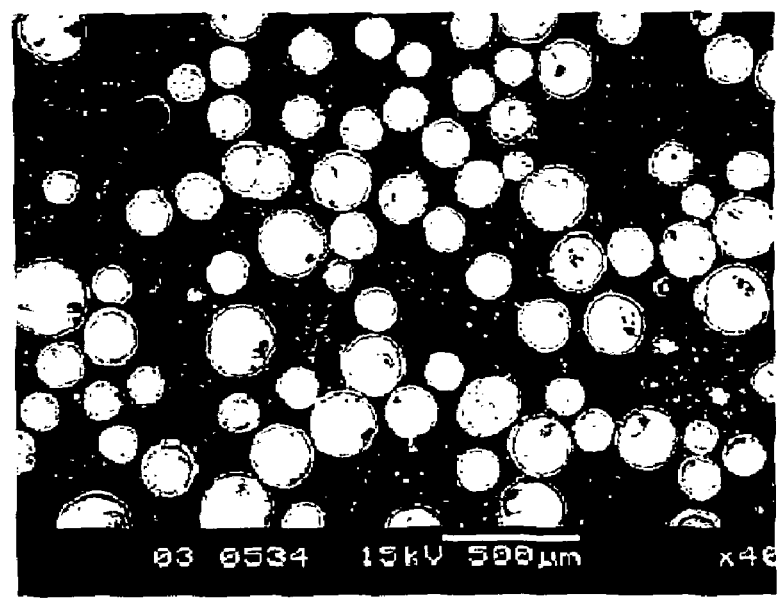
FIG. 12 is a scanning electron micrograph of synthetic hollow microspheres obtained from Example 5.
Figure 13:
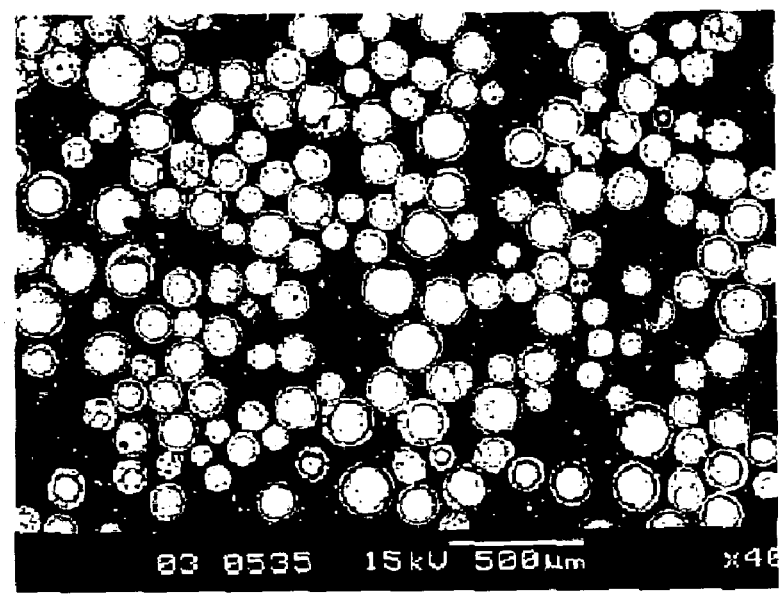
FIG. 13 is a scanning electron micrograph of synthetic hollow microspheres obtained from Example 5.
Figure 14:
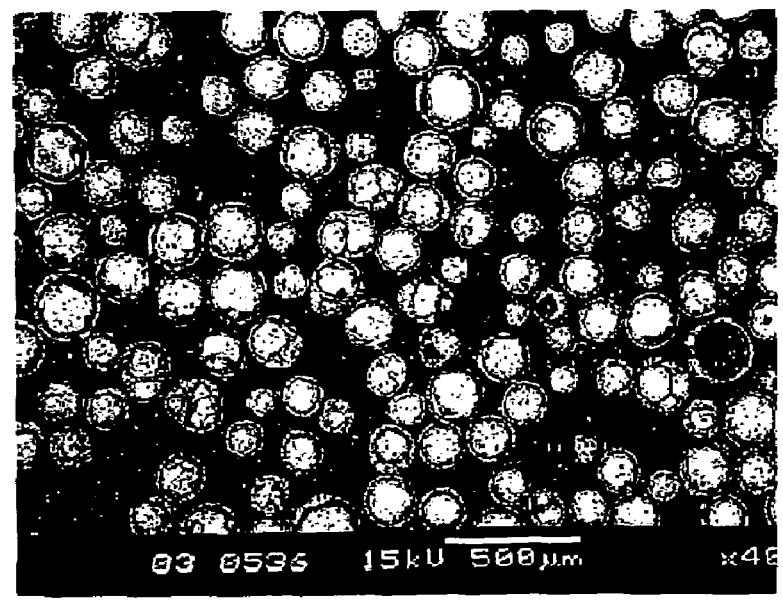
FIG. 14 is a scanning electron micrograph of synthetic hollow microspheres obtained from Example 5.

About 93.5 grams of basalt ground to an average size of about 1 micron was mixed with about 5 grams of a commercial grade solid sodium hydroxide (flakes), about 1.5 grams of a commercial grade silicon carbide, and about 37.4 ml of water. The composition of basalt is given in table 9. The mixture was blended into homogeneous slurry, poured into a flat dish and allowed to solidify at room temperature for about 5 minutes. The resulting product was further dried at about 50° C. for about 20 hours, after which it was ground and sieved to obtain powders within a size range of about 106 to 180 microns. In the next step, the powders were fed into a vertical heated tube furnace at an approximate feed rate of about 0.14 grams/min. The gas flow inside the tube furnace is about 1 litre of air plus 3 litres of nitrogen per minute. The constant temperature zone of the furnace was adjusted to provide residence times from less than a second to approximately few seconds at the peak firing temperatures. The foamed microspheres were collected on a funnel shaped collecting device covered with a fine mesh screen positioned at the bottom part of the furnace. A mild suction was applied to the end of funnel to aid in collecting the microspheres. The products were characterized for particle density (e.g. apparent density), percent of water floatation, and approximate particle diameter distribution. The results for various firing temperatures and residence times are summarized in Table 11. FIGS. 12-14 show the cross section of the products.

TABLE 11

| Temperature (degree C.) | Residence time (second) | Apparent density (g/cm$^3$) | Water float (%) | Size of microspheres (micron) |
|---|---|---|---|---|
| 1300 | 0.6-1.1 | 0.61 | | |
| 1250 | 0.6-1.1 | 0.56 | 86 | 130-260 |
| 1200 | 0.6-1.1 | 0.59 | | 85-195 |
| 1150 | 0.6-1.1 | 1.21 | | 105-240 |

EXAMPLE 6

This example illustrates a method to make synthetic microspheres form a formulation comprising fly ash, sodium hydroxide, and silicon carbide.

Figure 15:
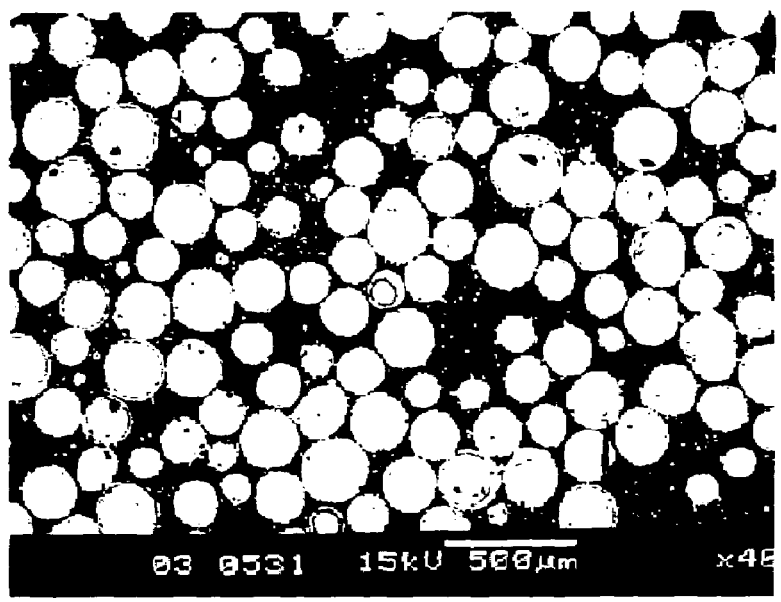
FIG. 15 is a scanning electron micrograph of synthetic hollow microspheres obtained from Example 6.
Figure 16:
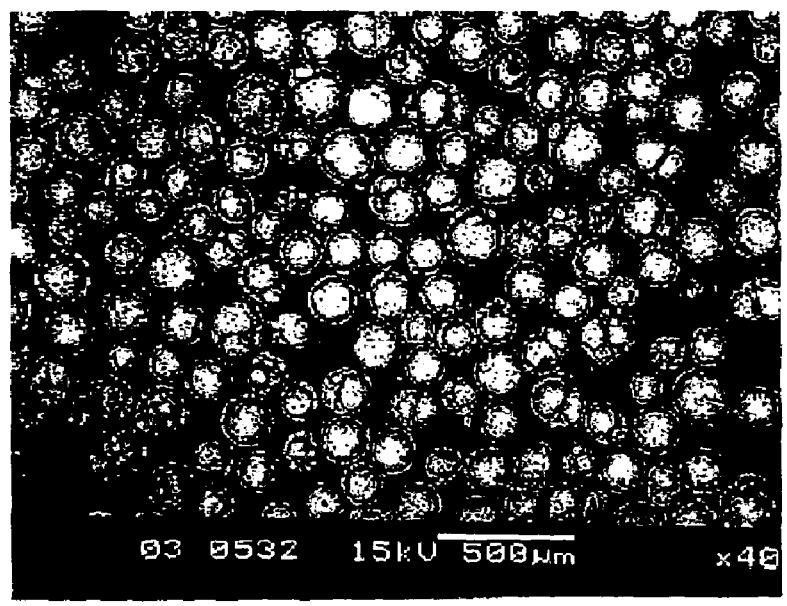
FIG. 16 is a scanning electron micrograph of synthetic hollow microspheres obtained from Example 6.

About 93.5 grams of a type F fly ash ground to an average size of about 1.3 microns was mixed with about 5 grams of solid sodium hydroxide (flakes), about 1.5 grams of a commercial grade silicon carbide, and about 37.4 ml of water. The composition of the fly ash is given in Table 12A. The mixture was blended into a homogeneous slurry, poured into a flat dish and allowed to solidify at room temperature for about 5 minutes. The resulting product was further dried at about 50° C. for about 20 hours, after which it was ground and sieved to obtain powders within a size range of about 106 to 180 microns. In the next step, the powders were fed into a vertical heated tube furnace at an approximate feed rate of about 0.14 grams/min. The gas flow inside the tube furnace was about 1 litre of air plus 3 litres of nitrogen per minute. The constant temperature zone of the furnace was adjusted to provide residence times from less than a second to approximately a few seconds at the peak firing temperatures. The foamed microspheres were collected on a funnel shaped collecting device covered with a fine mesh screen positioned at the bottom part of the furnace. A mild suction was applied to the end of the funnel to aid in collecting the microspheres. The products were characterized for particle density (e.g. apparent density), percent of water floatation, and approximate particle diameter distribution. The results for various firing temperatures and residence times are summarized in Table 12. FIGS. 15 and 16 show the cross section of the products.

TABLE 12A

| LOI | SiO$_2$ | Al$_2$O$_3$ | Fe$_2$O | CaO | MgO | SO$_3$ | Na$_2$O | K$_2$O | TiO$_2$ | Mn$_2$O$_3$ | P$_2$O$_5$ | Total |
|---|---|---|---|---|---|---|---|---|---|---|---|---|
| 0.40 | 61.53 | 17.91 | 4.72 | 7.30 | 2.91 | 0.40 | 2.16 | 1.39 | 0.86 | 0.08 | 0.28 | 99.94 |

All amounts are in percentage of weight

TABLE 12B

| Temperature (degree C.) | Residence time (second) | Apparent density (g/cm$^3$) | Water float | Size of microspheres (micron) |
|---|---|---|---|---|
| 1400 | 0.6-1.1 | 0.52 | 83 | |
| 1300 | 0.6-1.1 | 0.49 | 96 | 130-280 |
| 1250 | 0.6-1.1 | 0.58 | | 105-220 |

EXAMPLE 7

This example illustrates a method to make synthetic microspheres form a formulation comprising fly ash, sodium hydroxide, silicon carbide as a primary blowing agent and carbon black a secondary blowing agent.

Figure 17:
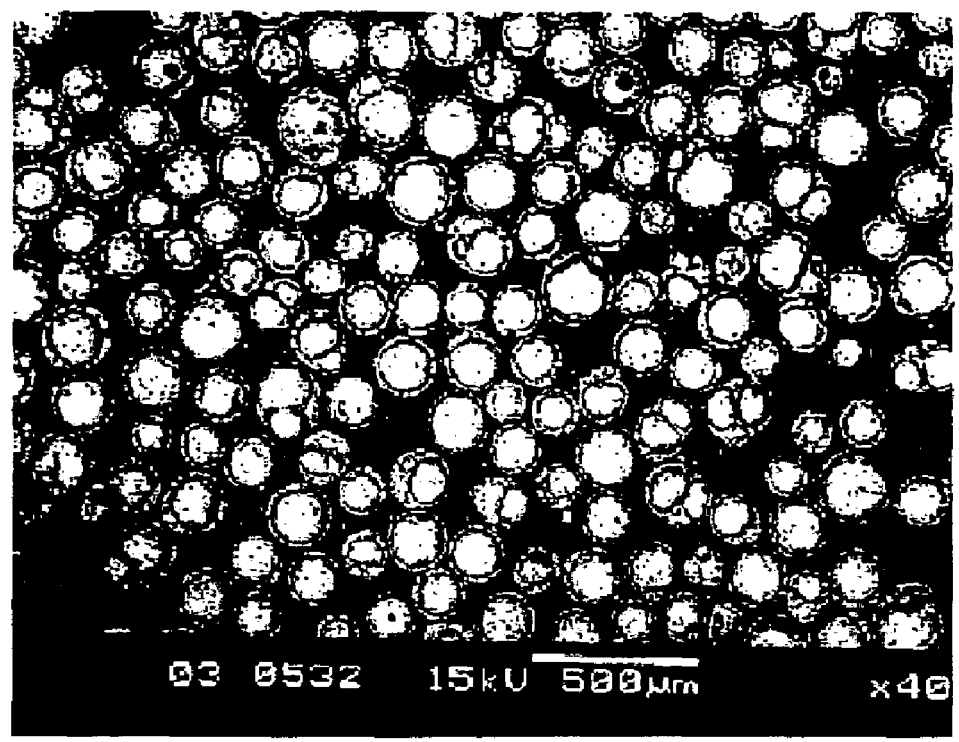
FIG. 17 is a scanning electron micrograph of synthetic hollow microspheres obtained from Example 7.
Figure 17:
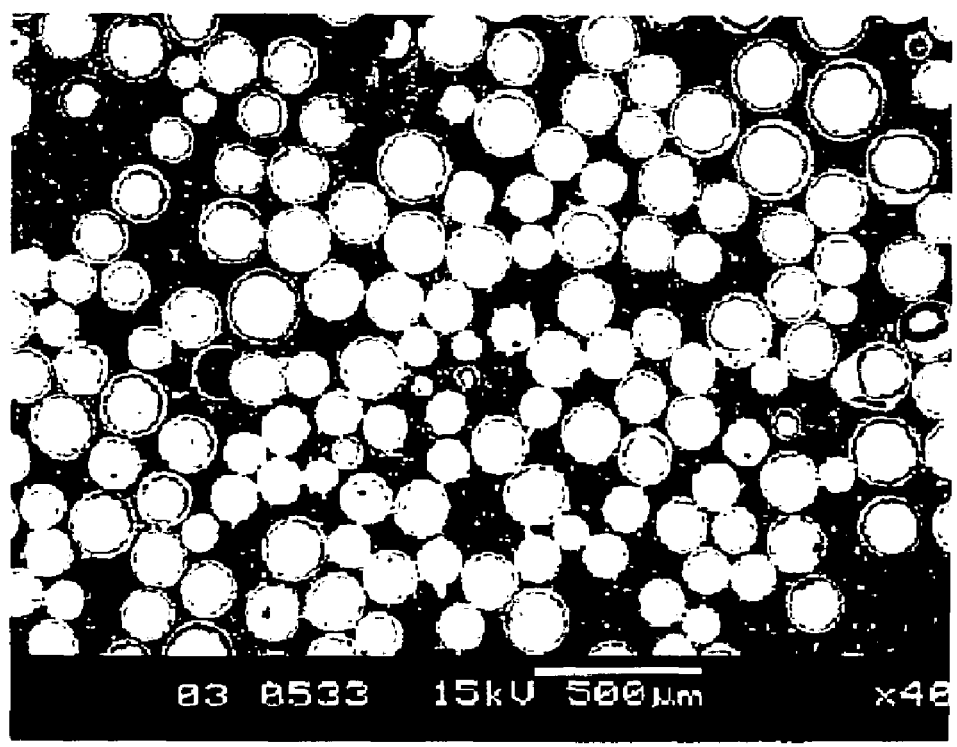

About 93.8 grams of a type F fly ash ground to an average size of about 1.3 microns was mixed with about 5 grams of solid sodium hydroxide (flakes), about 0.2 grams of a commercial grade silicon carbide, about 1 gram of commercial grade carbon black, and about 37.5 ml of water. The composition of the fly ash is given in Table 2. The mixture was blended into a homogeneous slurry, poured into a flat dish and allowed to solidify at room temperature for about 5 minutes. The resulting product was further dried at about 50° C. for about 20 hours, after which it was ground and sieved to obtain powders within a size range of about 106 to 180 microns. In the next step, the powders were fed into a vertical heated tube furnace at an approximate feed rate of about 0.14 grams/min. The gas flow inside the tube furnace was about 1 litre of air plus 3 litres of nitrogen per minute. The constant temperature zone of the furnace was adjusted to provide residence times from less than a second to approximately a few seconds at the peak firing temperatures. The foamed microspheres were collected on a funnel shaped collecting device covered with a fine mesh screen positioned at the bottom part of the furnace. A mild suction was applied to the end of funnel to aid in collecting the microspheres. The products were characterized for particle density (e.g. apparent density), percent of water floatation, and approximate particle diameter distribution. The result is summarized in Table 12C. FIG. 17 shows the cross section of the product.

TABLE 12

| Temperature (degree C.) | Residence time (second) | Apparent density (g/cm$^3$) | Water float (%) | Size of microspheres (micron) |
|---|---|---|---|---|
| 1300 | 0.6-1.1 | 0.65 | 82 | 105-220 |

EXAMPLE 8

The compositions (percentage of weight) of synthetic microspheres ("A" and "B") according to one preferred embodiment of the present invention were compared with a sample of commercially available harvested cenospheres. The results are shown in Table 13.

TABLE 12C

| Major Oxides | Harvested Cenosphere | Synthetic Microsphere "A" | Synthetic Microsphere "B" |
|---|---|---|---|
| SiO$_2$ | 62.5 | 58.9 | 65.8 |
| Al$_2$O$_3$ | 25.2 | 17.1 | 12.8 |
| Fe$_2$O | 3.7 | 4.5 | 3.3 |
| CaO | 1.1 | 7.0 | 5.2 |
| MgO | 1.7 | 2.8 | 2.0 |
| Na$_2$O | 1.1 | 5.2 | 6.8 |
| K$_2$O | 1.9 | 1.3 | 1.0 |
| SO$_3$ | 0.5 | 0.4 | 0.3 |
| Others | 2.3 | 2.8 | 2.8 |

EXAMPLE 9

This example shows typical spray drying conditions used to produce agglomerate precursors in certain preferred embodiments of the present invention.

Dryer: Bowen Engineering, Inc. No 1 Ceramic Dryer fitted with a two-fluid nozzle type 59-BS
Air nozzle pressure: about 20 psi
Cyclone vacuum: about 4.5
Inlet/Outlet temperature: about 550° C./120° C.
Chamber vacuum: about 1.6
Slurry solids: about 50%

Agglomerate precursors produced using these spray drying conditions had a suitable average particle diameter and particle diameter distribution for forming synthetic hollow microspheres therefrom.

It will be appreciated that embodiments of the present invention have been described by way of example only and the modifications of detail within the scope of the invention will be readily apparent to those skilled in the art.

One preferred method of the present invention advantageously provides a means for producing microspheres in high yield from widely available and inexpensive starting materials, such as fly ash, natural rocks and minerals. Hence, the method, in its preferred forms, reduces the overall cost of producing microspheres, and consequently increases the scope for their use, especially in the building industry where the use of presently available cenospheres is relatively limited due to their prohibitive cost and low availability. Hitherto, it was not believed that hollow microspheres could be formed synthetically from waste aluminosilicate materials, such as fly ash.

A further advantage of one embodiment of the present invention, in its preferred form, is that the microspheres produced may be tailor-made to suit a particular purpose. For example, the size, density and composition of the microspheres may be modified, as required, by modifying the relative amounts of ingredients and/or the temperature profile/exposure time during formation.

Still a further advantage of one embodiment of the present invention, in its preferred form, is that the microspheres produced have acceptably high chemical durability and can withstand, for example, a highly caustic environment of pH about 12-14 for up to about 48 hours. Thus, microspheres produced according to one preferred embodiment of the present invention can withstand aqueous cementitious environments, such as Portland cement paste.

Moreover, in most cases, fiber cement products are cured for up to 24 hours in an autoclave that is maintained at temperatures as high as 250° C. Microspheres produced according to one preferred embodiment of the present invention lose minimal amount of mass to dissolution, such as by leaching of silica, retain their shape, and continue to have high mechanical strength in fiber cement products, even after exposure to harsh autoclaving conditions.

Although the foregoing descriptions of certain preferred embodiments of the present invention have shown, described and pointed out some fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions.

What is claimed is:

1. A building material comprising:
a plurality of formed synthetic microspheres having an average particle diameter of between about 30 to 1,000 microns, said synthetic microspheres comprising an aluminosilicate material further comprising 30 wt. % to not more than 58.9 wt. % silicon dioxide, 12.8 to 40 wt. % aluminum oxide, not less than 5.2 wt. % to about 30 wt. % calcium oxide, about 4 to 10 wt. % sodium oxide, wherein the microspheres have an alkali metal oxide content of less than about 10 wt. % based on the weight of the microspheres, and wherein the synthetic microspheres are substantially chemically inert.

2. The building material of claim 1, wherein the synthetic microspheres comprise at least one synthetically formed cavity that is substantially enclosed by an outer shell.

3. The building material of claim 2, wherein the at least one cavity comprises about 30-95% of the aggregate volume of the microsphere.

4. The building material of claim 1, wherein the building material is used as a pillar.

5. The building material of claim 1, wherein the building material is used as a roofing tile.

6. The building material of claim 1, wherein the building material is used as a siding.

7. The building material of claim 1, wherein the building material is used as a wall.

* * * * *